US009098090B2

(12) United States Patent
Christensen et al.

(10) Patent No.: US 9,098,090 B2
(45) Date of Patent: Aug. 4, 2015

(54) FLIGHT CONTROL LAWS FOR FULL ENVELOPE BANKED TURNS

(75) Inventors: Kevin Thomas Christensen, Plano, TX (US); Shyhpyng Jack Shue, Grapevine, TX (US); Troy Sheldon Caudill, Burleson, TX (US); Nicholas Dean Lappos, Southlake, TX (US)

(73) Assignee: Textron Innovations Inc., Providence, RI (US)

( * ) Notice: Subject to any disclaimer, the term of this patent is extended or adjusted under 35 U.S.C. 154(b) by 310 days.

(21) Appl. No.: 13/703,800

(22) PCT Filed: Mar. 29, 2011

(86) PCT No.: PCT/US2011/030321
§ 371 (c)(1),
(2), (4) Date: Dec. 12, 2012

(87) PCT Pub. No.: WO2012/134447
PCT Pub. Date: Oct. 4, 2012

(65) Prior Publication Data
US 2013/0090788 A1    Apr. 11, 2013

(51) Int. Cl.
*G05D 1/08*    (2006.01)
*G05D 1/10*    (2006.01)
*B64C 27/22*   (2006.01)

(52) U.S. Cl.
CPC ............. *G05D 1/101* (2013.01); *G05D 1/0858* (2013.01)

(58) Field of Classification Search
CPC ............ G05D 1/08; G05D 1/10; B64C 15/00; B64C 19/00; B64C 27/04
USPC ............... 701/3, 4, 7, 10, 11, 301; 244/17.13, 244/3.15, 179, 195
See application file for complete search history.

(56) References Cited

U.S. PATENT DOCUMENTS

| 3,379,396 A | 4/1968 | Patterson |
| 5,062,583 A * | 11/1991 | Lipps et al. .................. 244/3.15 |
| 5,222,691 A | 6/1993 | Gold et al. |
| 5,553,817 A * | 9/1996 | Gold et al. .................... 244/195 |
| 6,648,269 B2 * | 11/2003 | Gold et al. ................. 244/17.13 |
| 2003/0191561 A1 * | 10/2003 | Vos .................................... 701/3 |
| 2008/0237392 A1 | 10/2008 | Piasecki et al. |
| 2010/0324758 A1 * | 12/2010 | Piasecki et al. .................. 701/3 |

OTHER PUBLICATIONS

International Search Report in corresponding PCT application PCT/US2011/030321 mailed Nov. 21, 2011, 7 pages.
EP Office Action dated May 8, 2014 from counterpart EP App. No. 11862586.2.
Office Action dated Jan. 22, 2015 from counterpart CA App. No. 2,830,485.

* cited by examiner

*Primary Examiner* — Tan Q Nguyen
(74) *Attorney, Agent, or Firm* — James E. Walton; Richard G. Eldredge

(57) ABSTRACT

A flight control system and method for controlling full envelope banked turns of an aircraft, the flight control system including one or more of a control law architectures having one or more control laws adapted for controlling the flight of an aircraft for full envelope banked turns.

18 Claims, 21 Drawing Sheets

| | Banked Turn ON | Banked Turn OFF |
|---|---|---|
| GCBT Envelope | Lat_ATT<br>Dir_TC | Lat_CRAB<br>Dir_HDG |
| BCBT Envelope | Lat_ATT<br>Dir_TC | Lat_HDG<br>Dir_TC |

FLIGHT CONTROL LAWS FOR FULL ENVELOPE BANKED TURNS

TECHNICAL FIELD

The present invention relates to flight control systems. In particular, this invention relates to flight control laws which enable coordinated banked turns at both low and high speeds.

DESCRIPTION OF THE PRIOR ART

Aircraft which can hover and fly at low speeds include rotorcraft, such as helicopters and tilt rotors, and jump jets, like the AV-8B Harrier and F-35B Lightning II. These aircraft can spend a large portion of their mission maneuvering at low speeds relative to the ground. Sometimes, this maneuvering must be conducted in confined spaces around external hazards such as buildings, trees, towers, and power lines.

For traditional flight control systems, ground-referenced maneuvering (GRM) requires the pilot to make constant control inputs in multiple axes in order to counter disturbances caused by wind, as well as to remove the natural coupled response of the aircraft. The pilot workload during such maneuvers can become quite high since the pilot must sense un-commanded aircraft motions and then put in the appropriate control input to eliminate the disturbance. In a worst-case scenario, a pilot might be required to fly GRM in a degraded visual environment. With the lack of visual cues to detect off-axis motion, the pilot might accidentally fly into an external hazard while maneuvering in a confined space.

Previous flight control law designs have addressed individual aspects of GRM, but have not provided an integrated approach to provide seamless and transient free piloted maneuvering relative to the ground in all control axes. A previous design for low speed turn coordination uses aircraft bank angle, forward groundspeed, and sideward groundspeed to compute the yaw rate required for a coordinated turn. Although this design works well at higher groundspeeds, above approximately 25 knots, at slower speeds, the small bank angles needed to control sideward speed can have a big effect on commanded yaw rate. For example, an aircraft flying in a right crosswind might require 5 degrees of right bank to hold its ground track. If the pilot were to command a left turn, the aircraft would initially yaw right until the aircraft started banking to the left. Another design addresses this shortcoming by allowing the pilot to manually set the non-turning roll trim attitude. However, this design requires additional cockpit switches which will add to the pilot's workload.

Another area where previous low speed turn coordination designs have been lacking is the transition between the high and low speed flight regimes. Specifically, these designs have resulted in undesirable aircraft transient responses with increased pilot workload when crossing through the transition region.

Several previous control law designs have been applied to modern control inceptors which always return to the center trim position when released. These "unique trim" inceptors have been widely used in fly-by-wire flight control designs in order to cut down on the space needed to integrate controllers into the cockpit. With a unique trim controller, the pilot commands a change in aircraft state with the controller out of the center "detent" position, and commands the aircraft to hold the current trim state with the controller returned to detent. The pilot can also use a cockpit switch to "beep" small changes to the aircraft state.

In the roll axis, many previous flight control law designs have adopted the attitude command/attitude hold (ACAH) response-type. With an ACAH unique trim design, the commanded roll attitude is proportional to the displacement of the lateral controller. When the controller is released, roll attitude will return to its original value. The main drawback of this design is that the pilot will have to hold the lateral controller command continuously during a banked turn. The inability to trim the aircraft into a banked turn will lead to increased pilot workload during missions that require the pilot to set up an orbit pattern.

In previous flight control designs, the yaw beep switch has been primarily used to input a constant yaw rate command into the control laws. This works well to command precise heading changes in a hover. However, in low or high speed forward flight, such a yaw beep will not result in a coordinated turn to the new heading. As such, this yaw beep design has had limited utility during precision GRM and higher speed instrument procedures.

Although the foregoing developments represent great strides in the area of flight control laws, many shortcomings remain.

BRIEF DESCRIPTION OF THE DRAWINGS

The novel features believed characteristic of the application are set forth in the appended claims. However, the application itself, as well as a preferred mode of use, and further objectives and advantages thereof, will best be understood with reference to the following detailed description when read in conjunction with the accompanying drawings, wherein:

Figure 1:
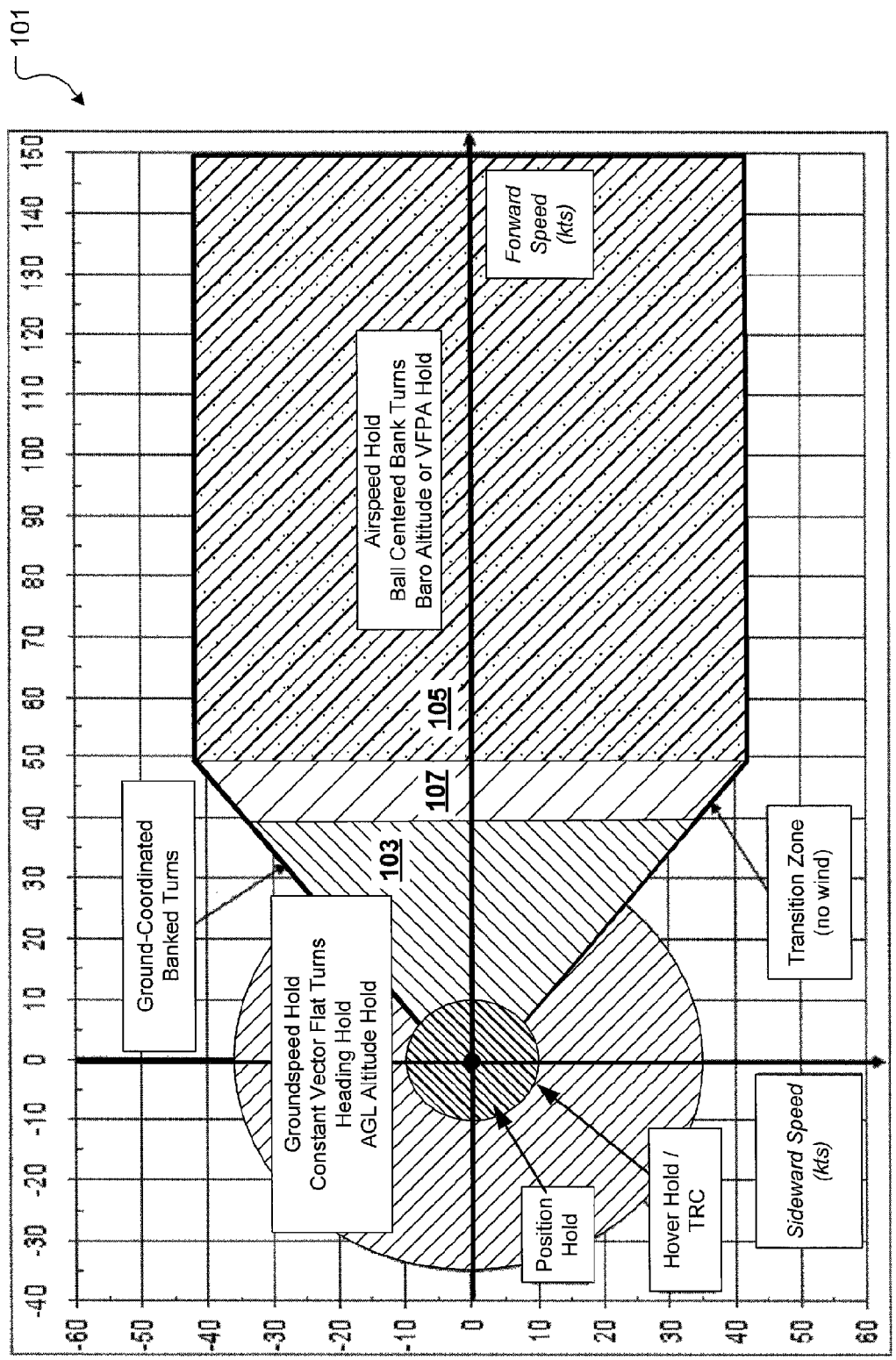
FIG. 1 shows a representative flight envelope with the control law modes designed to enable a Full Envelope Bank Turn (FEBT)

While the control system of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the process of the present application as defined by the appended claims.

DESCRIPTION OF THE PREFERRED EMBODIMENT

This invention will enable seamless and transient free GRM. More specifically, this invention will enable a pilot to precisely fly banked turns throughout the flight envelope. The Full Envelope Banked Turn (FEBT) capability includes Ground-Coordinated Banked Turns (GCBT) at low groundspeeds, Ball-Centered Banked Turns (BCBT) at higher airspeeds, and control law logic to seamlessly transition between these two regions. This invention also includes innovations that enable the pilot to trim the aircraft into a coordinated banked turn by using the roll beep switch and to command precise coordinated heading changes by using the heading beep switch.

Referring now to the drawings, FIG. 1 shows a representative flight envelope 101 with a plurality of control law modes designed to enable FEBT. Flight envelope 101 comprises a region 103 depicting the GCBT envelope, a region 105 depicting the BCBT envelope, and a region 107 depicting a no wind transition zone.

In BCBT envelope 105, the control laws will automatically adjust yaw rate based on actual bank angle, true airspeed, and lateral acceleration in order to keep the slip ball centered. Any directional controller inputs in BCBT envelope 105 will command a change in lateral acceleration, which will subsequently result in sideslip away from the pedal input. Pedal inputs will also result in a slight roll in the direction of the input to provide lateral stability.

In GCBT envelope 103, this invention proposes a new and novel control law design. Rather than using actual bank angle to adjust the yaw rate required for a coordinated turn, the GCBT design uses the pilot's commanded bank angle change from trim. With this innovation, the aircraft will start yawing in the correct direction as soon as a banked turn is commanded, even if the trim bank angle is in the opposite direction from the commanded turn. Additionally, this invention uses crab angle feedback in the directional axis to keep aircraft heading aligned with the ground track during GCBT. By minimizing crab angle during GCBT, the aircraft will always be flying where it is pointed. This will enable the pilot to precisely conduct GRM around obstacles in confined spaces with a single controller and with minimal risk of a tail strike.

Figure 2:
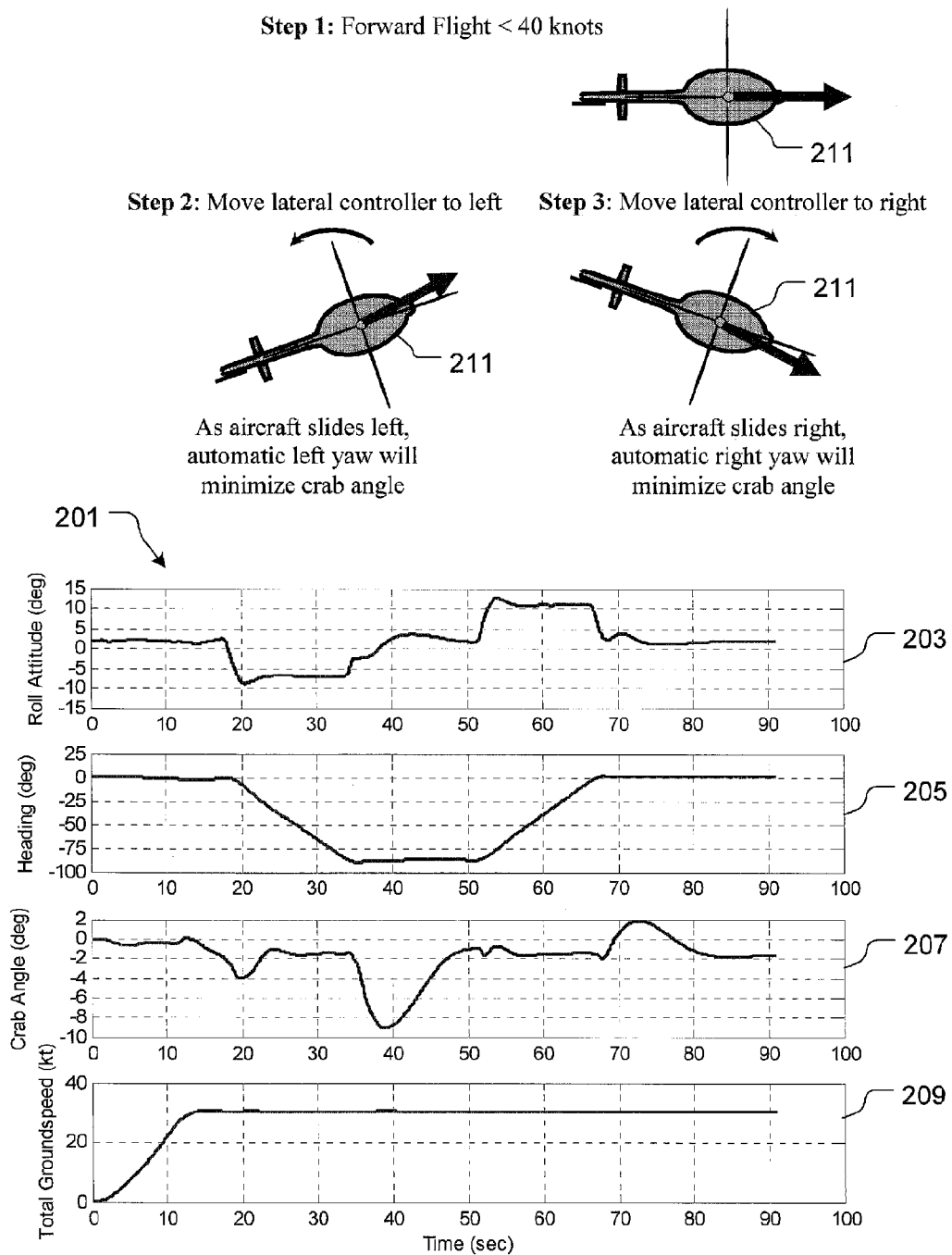
FIG. 2 shows examples of Ground-Coordinated Banked Turns (GCBT) flown with commands from the lateral controller.

FIG. 2 shows examples of GCBT flown with commands from the lateral controller. With the aircraft in forward flight within GCBT envelope 105, the pilot uses the lateral controller to bank the aircraft left or right. As the aircraft begins to slide to the side, the control laws will automatically adjust yaw rate to minimize crab angle. The collection of plots 201 in FIG. 2 are from simulation data of lateral controller GCBT flown to the left and right at 30 knots groundspeed (KGS). The first graph 203 shows that trim bank angle was several degrees to the right in order to hold crab angle before the 10° bank turns. The second graph 205 shows a 90° heading change to the left and then back to the right. The third graph 207 shows that crab angle during these turns stayed under 10°. The last graph 209 shows the initial acceleration to 30 KGS and then a constant total groundspeed during the GCBT.

FIG. 2 also shows an aircraft 211 performing the foregoing features described above, as provided in graphs 203, 205, 207, and 209. In the preferred embodiment, aircraft 211 is a rotary aircraft, i.e., a helicopter; however, it should be appreciated that the control system disclosed herein could be utilized on other types of aircraft and should not be limited to rotary aircraft. Step 1 depicts aircraft 211 moving in a forward direction less than 40 knots. Step 2 depicts movement of aircraft 211 as the lateral controller (not shown) is moved to the left. As aircraft 211 slides left, the automatic left yaw will minimize the crab angle. Finally, step 3 depicts aircraft 211 moving to the right as the lateral controller and the automatic right yaw minimizing the crab angle.

Figure 3:
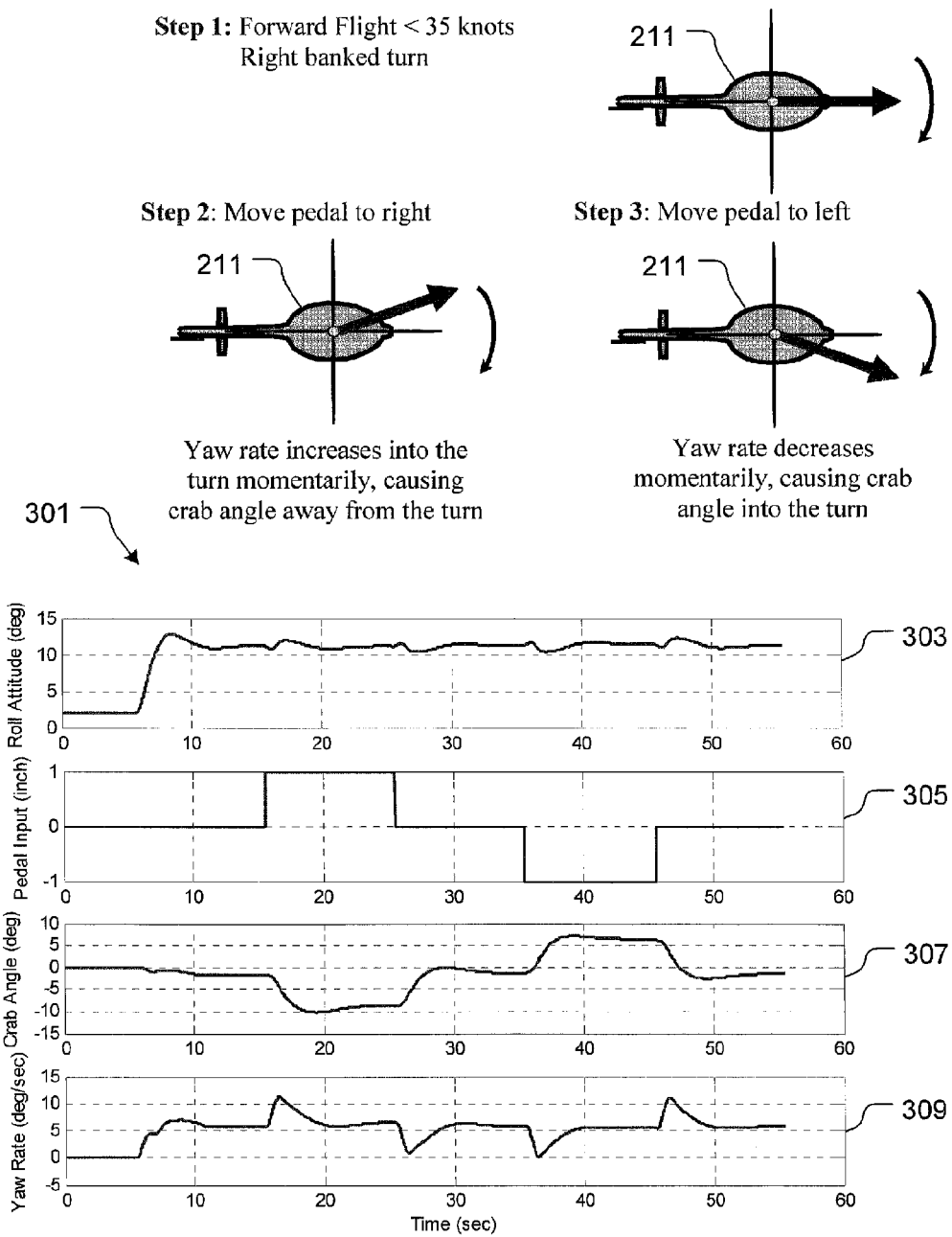
FIG. 3 shows examples and simulation data of directional controller inputs during a right GCBT flown at 30 KGS.

Any directional controller inputs during GCBT will command a change in crab angle. FIG. 3 shows examples and simulation data of directional controller inputs during a right GCBT flown at 30 KGS. The aircraft's bank angle stayed steady during the directional controller inputs. In step 1, aircraft 211 moves in a forward direction less than 35 knots while performing a right banked turn. In step 2, the right input momentary increased yaw rate to the right into the turn, resulting in a left crab angle away from the turn. In step 3, the left directional controller input momentarily slowed down the yaw rate, resulting in a right crab angle into the turn.

In level, non-banked flight, the control laws will hold aircraft heading. In the BCBT envelope 105, the control laws hold heading by adjusting bank angle, while the slip ball is kept centered through directional axis feedback. In the GCBT envelope 103, this methodology is reversed. The control laws hold heading through directional axis feedback, while crab angle is held by adjusting bank angle.

During heading beeps in the BCBT envelope 105, the control laws will command a bank angle to follow the heading as it is beeped. In the GCBT envelope 103, the heading beep will result in a yaw rate. The crab angle feedback in the lateral axis will subsequently bank the aircraft, resulting in a heading beep GCBT.

FIG. 3 shows a collection of graphs 301 providing data measurement of aircraft 211 while performing the foregoing maneuvers described above. Graph 303 illustrates the roll rate of aircraft 211 in relation to time. Graph 305 illustrates the pedal input per inch in relation to time. Graph 307 illustrates the crab angle of aircraft 211 in relation to time. And, graph 309 illustrates the yaw rate of aircraft 211 in relation to time.

Figure 4:
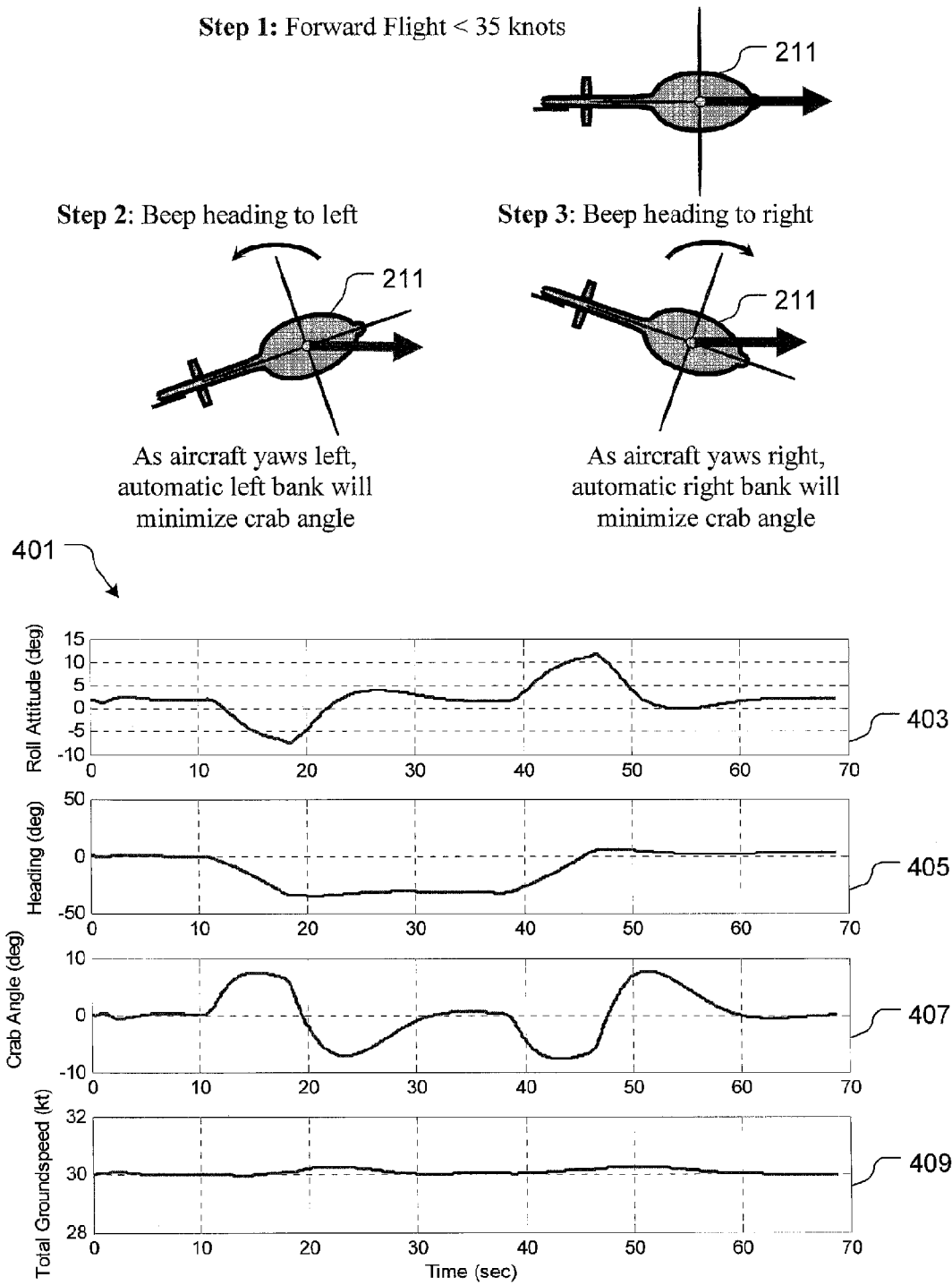
FIG. 4 shows examples of GCBT flown with heading beep commands.

FIG. 4 shows examples of GCBT flown with heading beep commands. With the aircraft in forward flight within the GCBT envelope, the pilot uses the heading beep to yaw the aircraft left or right. In step 1, aircraft 211 moves in forward flight less than 35 knots. As crab angle begins to build, the control laws will automatically adjust bank angle to hold crab angle during the heading beep turn. In step 2, as aircraft 211 yaws left, the automatic left bank will minimize crab angle. In step 3, as aircraft 211 yaws right, the automatic right bank will minimize crab angle.

The collection of graphs 401 in FIG. 4 show GCBT simulation data of heading beep turns flown to the left and right at 30 KGS. Graph 403 shows the bank angle needed to keep crab angle at a minimum during the turns. Graph 405 shows a 30° heading change to the left and then back to the right. Graph 407 shows that crab angle during these turns stayed under 10°. Graph 409 shows a constant total groundspeed during the GCBT.

Figure 5:
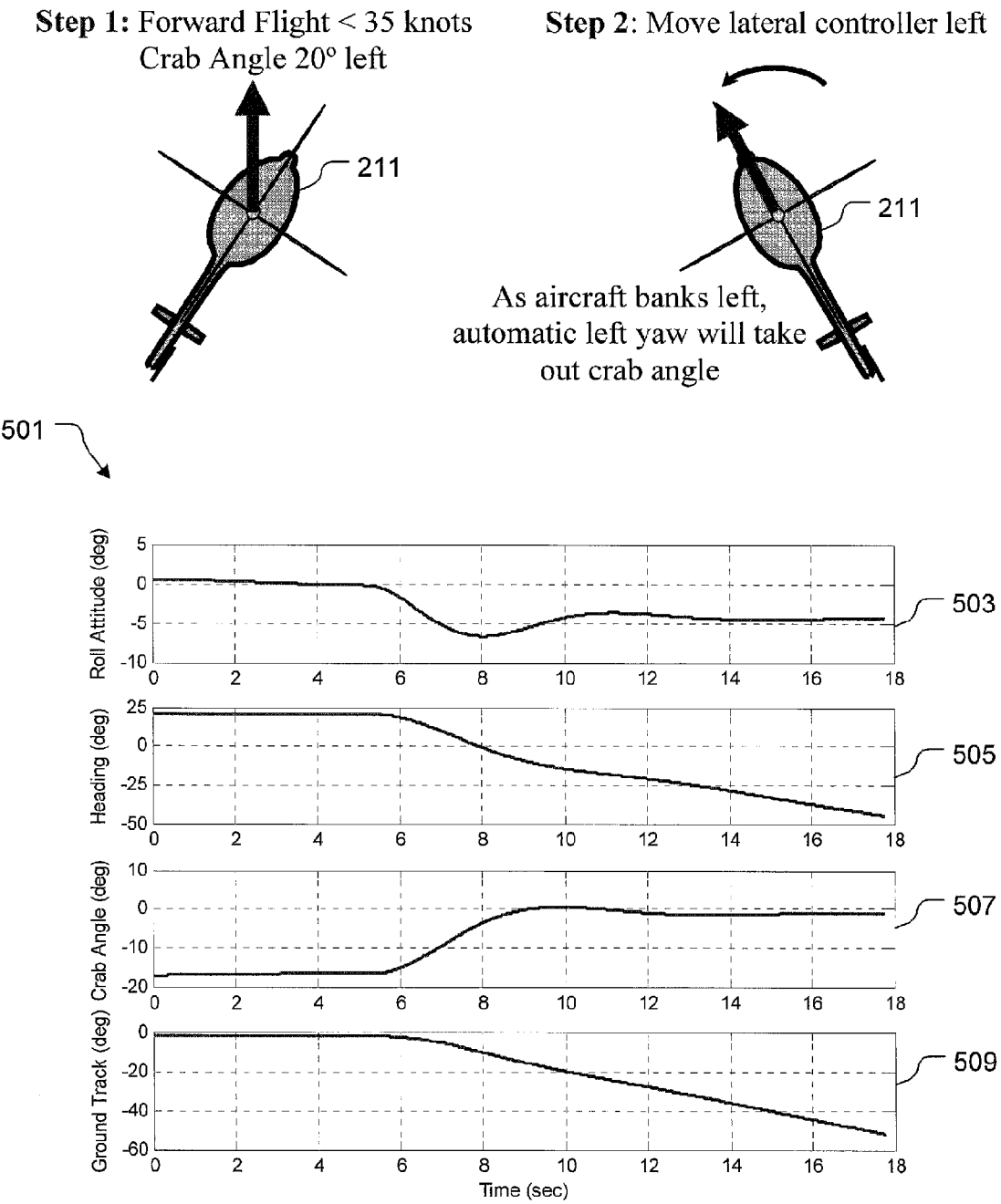
FIG. 5 shows an example and simulation data of a GCBT into the crab.

If the aircraft is in a crab in the GCBT envelope, the control laws will automatically drive crab angle to zero (decrab) when the pilot commands a turn. FIG. 5 shows an example and simulation data of a GCBT into the crab. In step 1, aircraft 211 starts in a 20° left crab. When the pilot commands a left bank, the control laws will automatically decrab the aircraft with a left yaw, as shown in step 2.

FIG. 5 shows a collection of graphs 501 providing data measurement of aircraft 211 while performing the foregoing maneuvers described above. Graph 503 illustrates the roll attitude of aircraft 211 in relation to time. Graph 505 illustrates the heading in relation to time. Graph 507 illustrates the crab angle of aircraft 211 in relation to time. And, graph 509 illustrates the ground track of aircraft 211 in relation to time. Graph 503 and graph 507 show that crab angle was driven to zero within about 3 seconds of the initiation of the turn. Graph 509 shows that ground track changed smoothly during this turn, even with the decrab maneuver.

Figure 6:
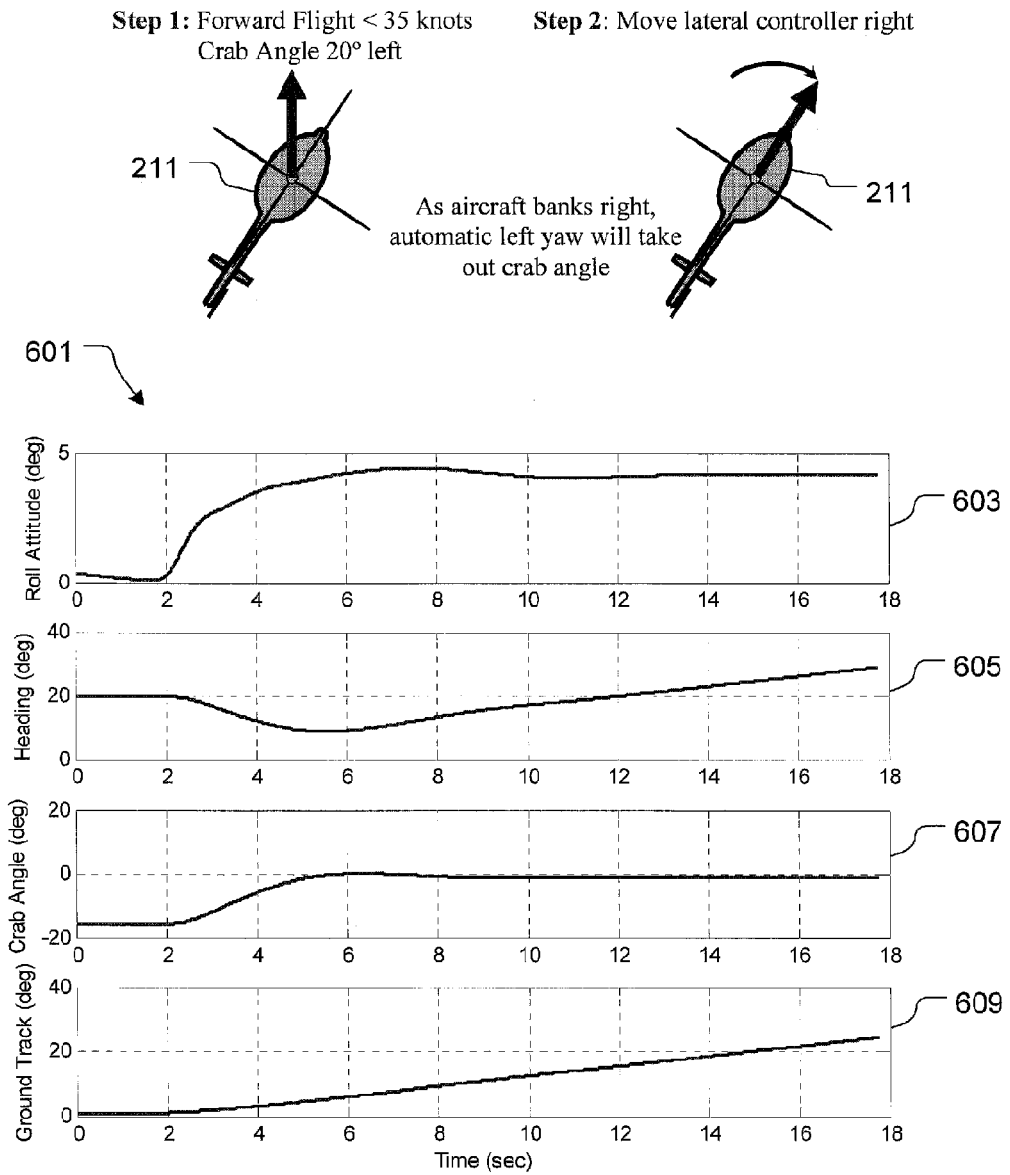
FIG. 6 shows an example and simulation data of a GCBT away from the crab.

FIG. 6 shows an example and simulation data of a GCBT away from the crab. In step 1, aircraft 211 starts in a 20° left crab. In step 2, when the pilot commands a right bank, the control laws will automatically decrab the aircraft with a left yaw.

FIG. 6 shows a collection of graphs 601 providing data measurement of aircraft 211 while performing the foregoing maneuvers described above. Graph 603 and graph 607 show that crab angle was driven to zero within about 3 seconds of the initiation of the turn. Graph 605 shows that heading actually started away from the turn direction during the decrab. However, like the turn into the crab, graph 609 shows that actual ground track changed smoothly during this GCBT.

When accelerating forward from a hover in a crosswind with no turning inputs, the control laws will automatically adjust bank to hold crab angle, while holding constant heading with directional axis feedback. With headwind below 20 knots, the control laws will transition to the BCBT envelope when accelerating through 50 knots indicated airspeed (KIAS).

Figure 7:
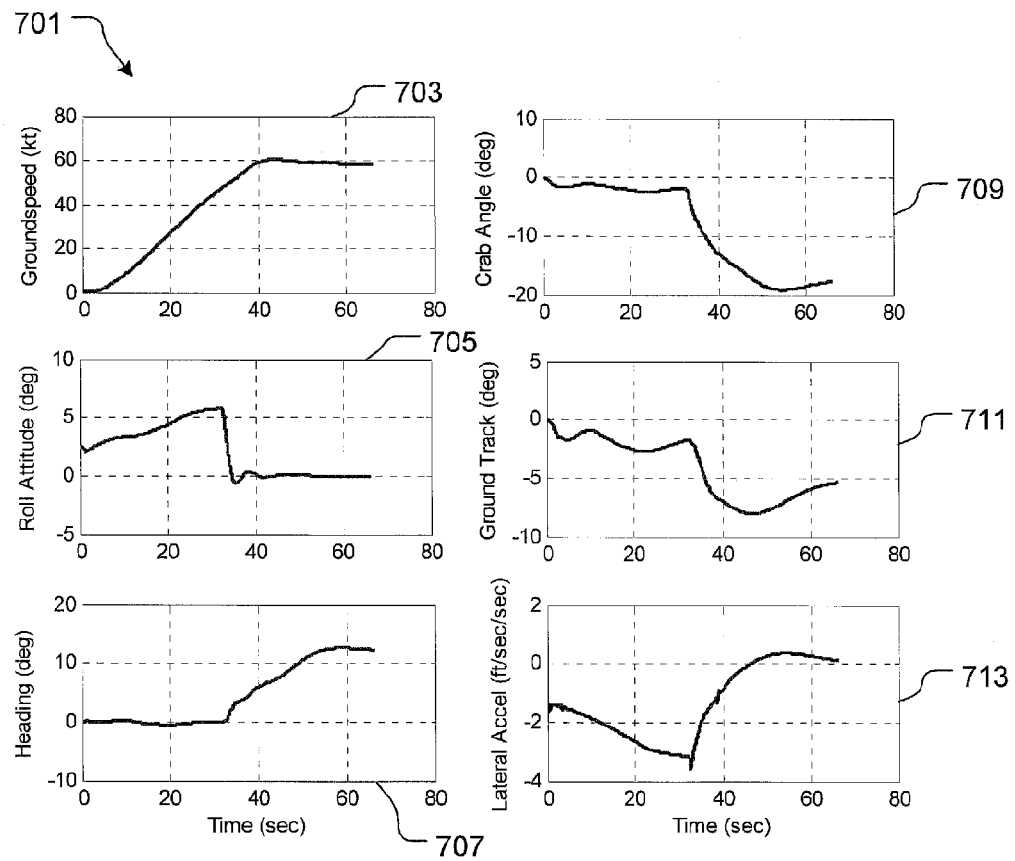
FIG. 7 shows simulation data from a forward acceleration from hover in a 20 knot right crosswind.

FIG. 7 shows a collection of plots 701 illustrating simulation data from a forward acceleration of aircraft 211 from hover in a 20 knot right crosswind. Plots 701 show that crab angle held within 2° with right bank into the crosswind during the acceleration to 50 KIAS. Passing 50 KIAS, bank transitioned to near zero and the crab angle picked up to nearly 20° left. At the same time, lateral acceleration went from around 3 ft/sec$^2$ to near zero as the slip ball centered. Aircraft heading drifted off slightly into the right crosswind during the transition. This heading transient had the overall effect of keeping ground track within 8°. Plot 703 shows the groundspeed of aircraft 211 with relation to time. Plot 705 shows the roll attitude with relation to time. Plot 707 shows the heading with relation to time. Plot 709 shows the crab angle with relation to time. Plot 711 shows the ground track with relation to time. And, plot 713 shows lateral accel with relation to time.

Figure 8:
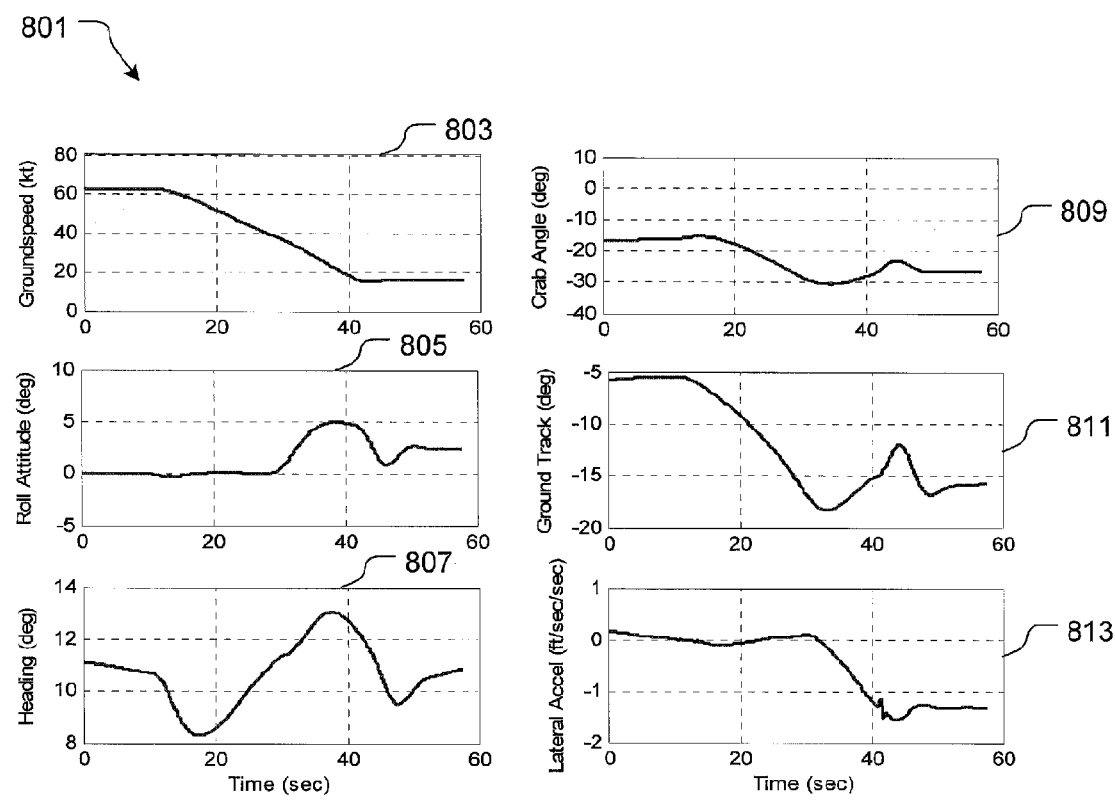
FIG. 8 shows simulation data for a deceleration from 60 KIAS in a 20 knot right crosswind.

When decelerating from higher speeds with no turn inputs and with a headwind below 20 knots, the control laws will transition to the GCBT envelope when passing 40 KIAS. FIG. 8 shows a collection of plots 801 illustrating simulation data for a deceleration of aircraft 211 from 60 KIAS in a 20 knot right crosswind. Plots 801 show that, while in the BCBT envelope, the crosswind caused crab angle to steadily increase during the constant heading deceleration. Plot 803 shows the groundspeed of aircraft 211 with relation to time. Plot 805 shows the roll attitude with relation to time. Plot 807 shows the heading with relation to time. Plot 809 shows the crab angle with relation to time. Plot 811 shows the ground track with relation to time. And, plot 813 shows lateral accel with relation to time.

When the control laws transitioned to the GCBT envelope at 40 KIAS, the aircraft banked into the crosswind to keep crab angle from increasing further. Additionally, the directional axis transferred to heading hold, resulting in the slip ball being off center as seen in the lateral acceleration response. During the rest of the deceleration, crab angle held within about 5°, while ground track held within about 2-3°. If the pilot had used the lateral controller to adjust ground track during this portion of the deceleration, the crab angle would have been driven to zero as shown in FIGS. 5 and 6. During the entire deceleration from 60 KIAS, heading held within 3°.

When accelerating or decelerating through the transition zone while in a banked turn, the directional axis will blend between GCBT and BCBT. With a headwind below 20 knots, the directional control laws will be in the GCBT envelope at 40 KIAS, in the BCBT envelope at 50 KIAS, and blend between the two modes in the transition zone.

Figure 9:
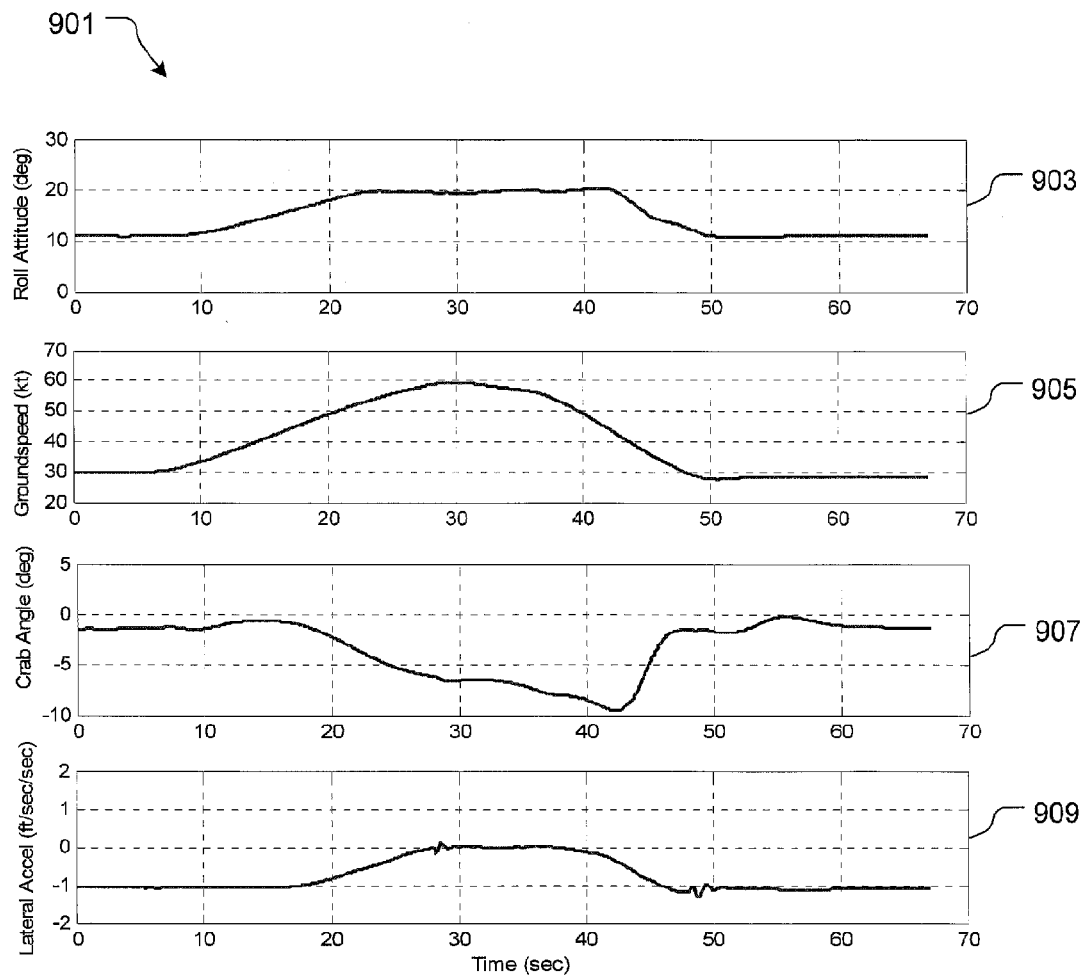
FIG. 9 shows an acceleration and deceleration through the transition zone in a right banked turn.

FIG. 9 shows a collection of graphs 901 illustrating data of aircraft 211 during acceleration and deceleration through the transition zone in a right banked turn. Graph 903 illustrates the roll attitude of aircraft 211 in relation to time. Graph 905 illustrates the groundspeed in relation to time. Graph 907 illustrates the crab angle of aircraft 211 in relation to time. And, graph 909 illustrates the lateral acceleration of aircraft 211 in relation to time.

In order to keep turn rate nearly constant during the speed changes, the commanded bank angle for a constant lateral controller input will increase as speed increases and decrease as speed decreases. As speed increased through the transition zone, crab angle was no longer held near zero, while lateral acceleration went to zero to center the ball. During the deceleration through the transition zone the results were reversed.

Those skilled in the art will understand that the methods for aircraft guidance disclosed in this invention can be applied to any combination of the following: (1) full authority fly-by-wire flight control systems, as well as partial authority mechanical systems; (2) traditional cockpit layouts with a center stick for longitudinal and lateral control, pedals for directional control, and a collective stick for vertical control, as well as more advanced designs which combine multiple control axes into a center or side stick controller; and, (3) any aircraft capable of GRM, including both rotorcraft and jump jets.

Figure 10:
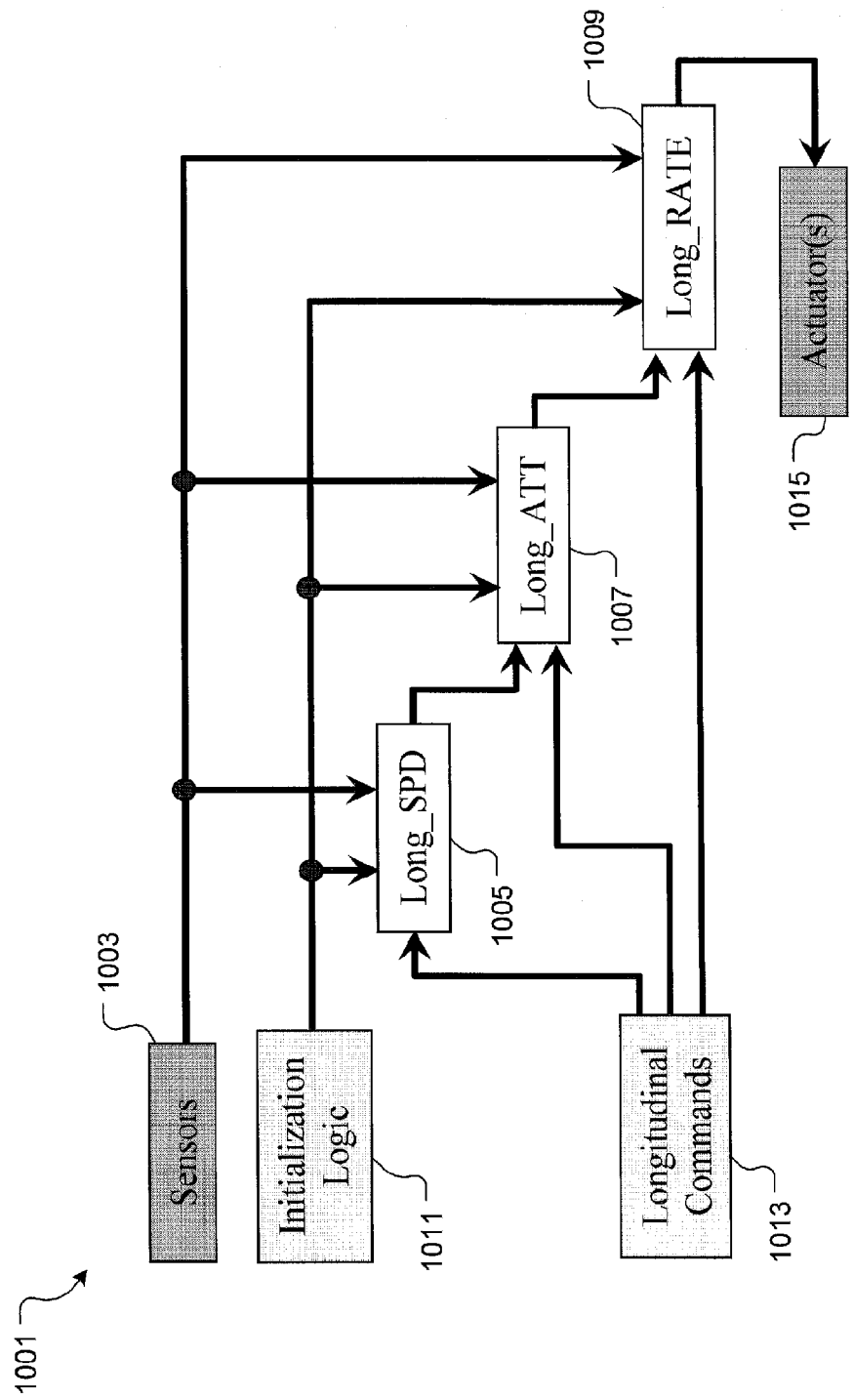
FIG. 10 shows the longitudinal control law architecture.
Figure 11:
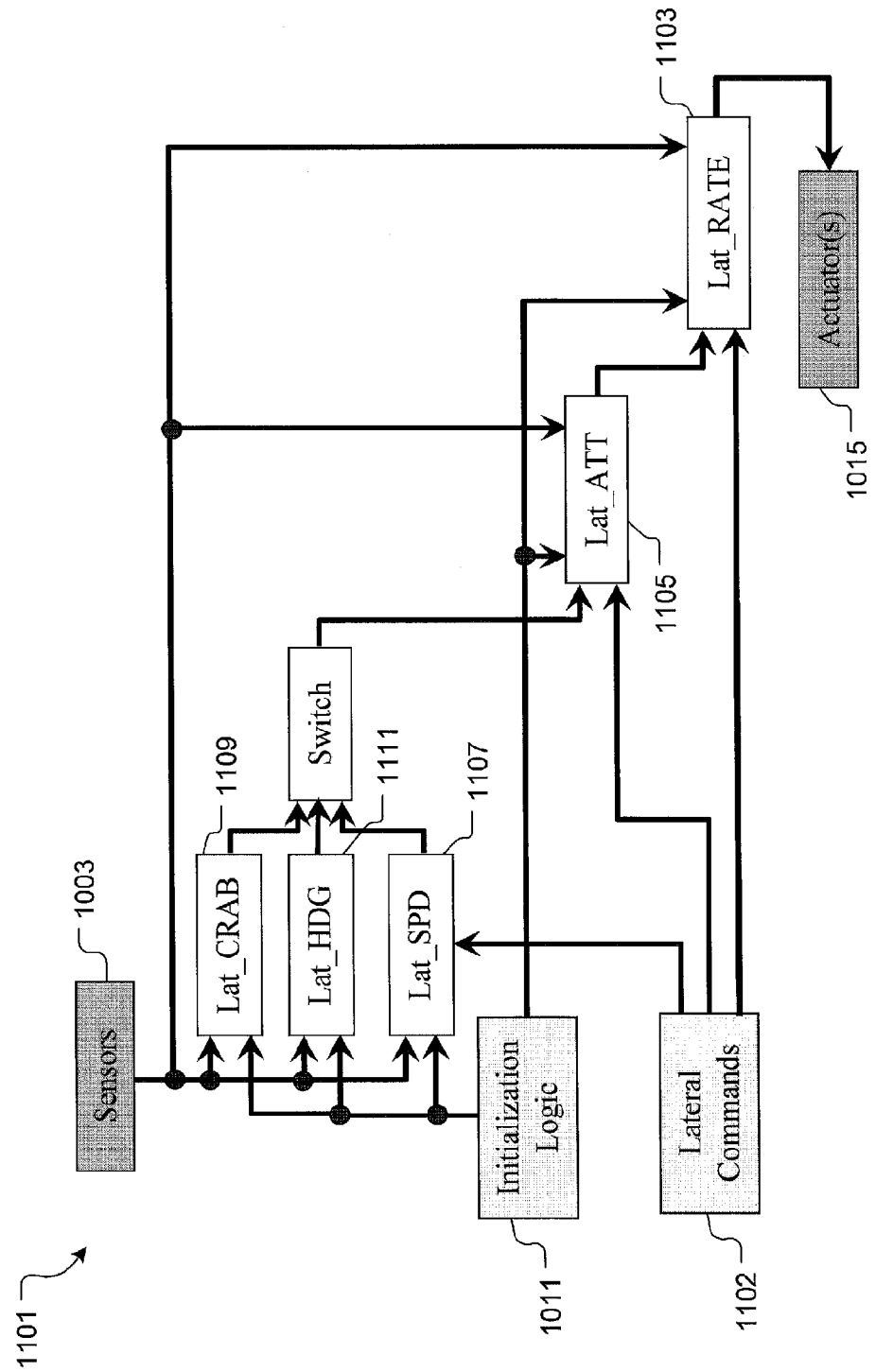
FIG. 11 shows the lateral control law architecture.
Figure 12:
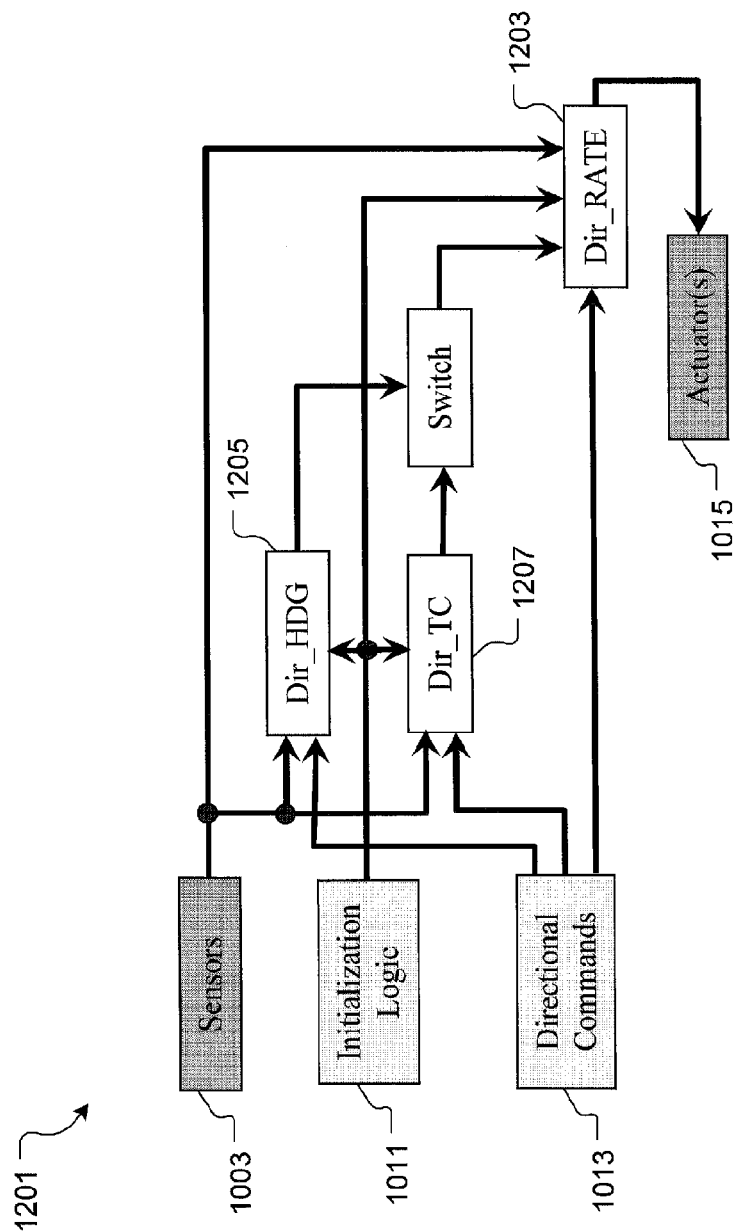
FIG. 12 shows the directional control law architecture.

The key to enabling the FEBT capability lies in the advanced control law architecture as shown in FIGS. 10 to 12. FIG. 10 shows the longitudinal control law architecture having one or more longitudinal control law loops. FIG. 11 shows the lateral control law architecture having one or more lateral control law loops. And, FIG. 12 shows the directional control law architecture having one or more directional control law loops.

Referring now to FIG. 10 in the drawings, architecture 1001 includes one or more aircraft sensors 1003 operably associated with the control laws to accomplish GRM. Aircraft sensors 1003 can include: an Inertial Navigation System (attitudes, attitude rates, and translational accelerations); a Global Positioning System (ground-referenced speeds and positions); an Air Data Computer (airspeed and barometric altitude); and, a Radar or Laser Altimeter (above ground level (AGL) altitude).

The control commands shown in FIGS. 10 through 12 are generated in the control laws by referencing the pilot's cockpit control input in each axis. The input to the control laws is the difference between the controller's present position and the centered, no force position, which is also referred to as the "detent" position. The control commands can also be generated by beep switches in the cockpit to command small and precise changes in aircraft state. The control laws process these control inputs to generate the appropriate aircraft response commands. These commands are then sent out to the control law guidance blocks to maneuver the aircraft.

In the preferred embodiment, architecture 1001 preferably comprises of a longitudinal control law for forward speed, represented as block 1005 "Long_SPD"; a longitudinal control law for pitch angle, represented as block 1007 "Long_ATT"; and, a longitudinal control law for pitch rate, represented as block 1009 "Long_RATE". Architecture 1001 is further provided with initialization logic 1011 adapted for determining which loop is active in each axis based on flight conditions and pilot control inputs. Logic 1011 will also re-initialize inactive loops in order to eliminate control jumps when switching between the loops to provide seamless and transient free mode changes.

Architecture 1001 further includes a longitudinal command 1013 generated in the control laws by referencing the pilot's cockpit control input in each axis. The input to the control laws is the difference between the controller's present position and the centered, no force position, which is also referred to as the "detent" position. The control commands can also be generated by a beep switch located in the cockpit to command small and precise changes in aircraft state. The control laws process these control inputs to generate the appropriate aircraft response commands. These commands are then sent out to the control law guidance blocks to maneuver the aircraft. The control law outputs are routed to an actuator 1015 for each dynamic axis. For a conventional helicopter, the control laws send control signals to the following actuators: longitudinal axis—main rotor longitudinal swashplate angle; lateral axis—main rotor lateral swashplate angle; vertical axis—main rotor collective pitch; and, directional axis—tail rotor collective pitch.

Since pitch rate is the fastest longitudinal state, Long_RATE 1009 is the inner loop of the longitudinal control laws. Next, the Long_ATT 1007 loop feeds the Long_RATE control law 1009 loop to control pitch attitude. Finally, the Long_SPD control law 1005 loop feeds the Long_ATT 1007 loop to control forward speed.

When flying with the longitudinal controller in detent outside of the Hover Hold/TRC region, depicted in FIG. 1, the Long_SPD 1005 loop will be active. At lower speeds, this loop will hold constant forward groundspeed, while at higher speeds, airspeed will be held. Once the pilot moves the longitudinal controller out of detent, the control laws can command either pitch attitude (Long_ATT 1007) or pitch rate (Long_RATE 1009).

Referring now to FIG. 11 in the drawings, architecture 1101 comprises one or more lateral control laws operably associated with sensors 1003, logic 1011, lateral commands 1102, and actuators 1015. The lateral control laws include: a lateral control of roll rate, represented as block 1103 "Lat_RATE"; a lateral control of the roll attitude, represented as block 1105 "Lat_ATT"; a lateral control of sideward groundspeed, represented as block 1107 "Lat_SPD"; a lateral control of the crab angle, represented as block 1109 "Lat_CRAB"; and, lateral control of heading, represented as block 1111 "Lat_HDG".

Similar to the longitudinal axis, Lat_RATE 1103 is the inner loop of the lateral control laws and the Lat_ATT 1105 loop feeds the Lat_RATE 1103 loop to control roll attitude. The Lat_ATT 1105 loop can be fed by one of three loops, Lat_SPD 1107, Lat_CRAB 1109, or Lat_HDG 1111.

Referring now to FIG. 12 in the drawings, architecture 1201 comprises one or more directional control laws operably associated with sensors 1003, logic 1011, commands 1213, and actuators 1015. The directional control laws include: directional control of yaw rate, represented as block 1203 "Dir_RATE"; directional control of heading, represented as block 1205 "Dir_HDG"; and, directional turn coordination, represented as block 1207 "Dir_TC".

Since yaw rate is the fastest directional state, Dir_RATE 1203 is the inner loop of the directional control laws. This loop is fed by the Dir_HDG 1205 loop to control aircraft heading at lower speeds. Unlike traditional control law designs, this invention includes an additional loop, parallel to the Dir_HDG 1205 bop, to feed the Dir_RATE 1203 inner loop. The Dir_TC 1207 loop is used to coordinate banked turns throughout the flight envelope.

Figure 13:
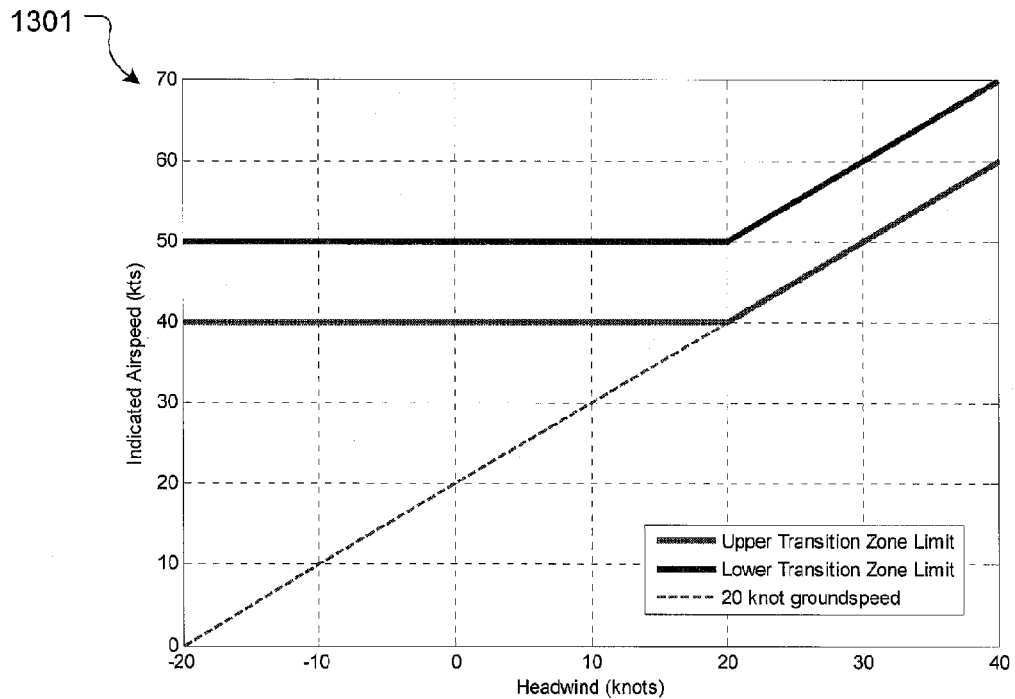
FIG. 13 shows how the transition zone is moved upward as headwind increases so that the lower limit will never drop below 20 KGS.

The speed transition zone between the BCBT envelope 103 and GCBT envelope 105 is based on indicated airspeed so that the pilot will have awareness of the control law region. The transition zone is 10 knots wide, with the lower limit at 40 KIAS when headwind is below 20 knots. FIG. 13 provides a plot 1301 depicting how the transition zone is moved upward as headwind increases so that the lower limit will never drop below 20 KGS. This algorithm ensures that the control laws will always be in the GCBT envelope when below 20 KGS, even when flying into a strong headwind.

When accelerating forward, the control laws will switch to the high speed BCBT envelope 103 when passing the upper limit of the transition zone. When slowing down, the switch to the GCBT envelope 105 will occur when passing the lower limit of the transition zone. This speed hysteresis prevents rapid switching between GCBT and BCBT control laws when operating in the transition zone.

The crab angle used in the Lat_CRAB loop 1109 is computed in the control laws using the following equation:

$$\eta = \tan^{-1}(V_y/V_x) \quad (1)$$

where $\eta$ is the crab angle, $V_y$ is the sideward groundspeed with right positive, and $V_x$ is the forward groundspeed. To avoid a singularity in Equation 1, $V_x$ is limited to be above the Hover Hold/TRC circle as shown in FIG. 1.

Figure 14:
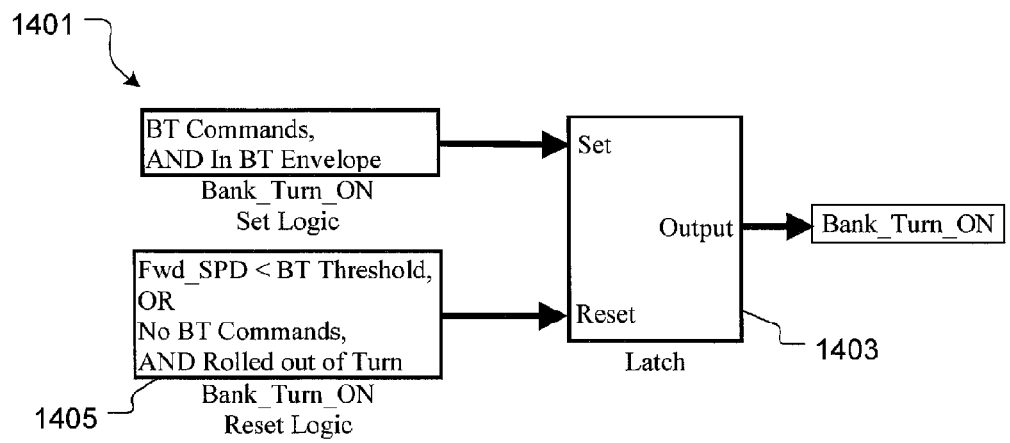
FIG. 14 shows the control laws use of the bank turn mode logic to determine which control block is active.

The control laws use the bank turn (BT) mode logic 1401 shown in FIG. 14 to determine which control block is active. The latch 1403 depicted in FIG. 14 controls whether the BT mode is turned on or off. If the reset conditions are met, then the mode will always be off. If the reset conditions are not met, then the mode will be latched on when the set conditions are met.

The BT mode will be reset whenever forward speed is less than the BT threshold (typically around 10 KGS), as shown in block 1405. Additionally, the BT mode will be reset if there are no BT commands and the aircraft is rolled out of the turn. Any of the following conditions are indicative of BT commands:

Lateral controller out of detent
    Roll beep switch depressed
    Directional controller out of detent when above the Constant Vector Flat Turn (CVFT) envelope The BT logic will consider the aircraft to be rolled out of a turn when all of the following conditions are met:
Bank attitude≤threshold (typically around 5°)
Roll rate≤threshold (typically around 5-10 deg/sec)
Yaw rate≤threshold (typically around 5-10 deg/sec)
The BT mode will be set when BT commands are present and the aircraft is operating is either the BCBT or GCBT envelopes as depicted in FIG. 1.

Figure 15:
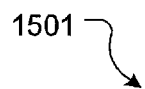
FIG. 15 shows the control law logic to determine which control block is active combines the BT mode with the BT envelopes.

The control law logic to determine which control block is active combines the BT mode with the BT envelopes 1501 as shown in FIG. 15. For the lateral axis, when the pilot moves the lateral controller out of detent to establish a banked turn, the BT mode will be on and the control laws will command roll attitude through the Lat_ATT loop. Once the lateral controller is returned to detent, the control laws will roll out of the turn. When bank angle, roll rate, and yaw rate drop below the banked turn thresholds, the BT mode will be turned off and either the Lat_CRAB or Lat_HDG loop will be engaged. When operating in the GCBT envelope, in non-turning flight with both the lateral and directional controllers in detent, lateral control law logic will hold crab angle through the Lat_CRAB loop. In the higher speed BCBT envelope during non-turning flight, control logic will hold heading constant through the Lat_HDG loop. During a non-turning acceleration, the control laws will switch from holding crab through the Lat_CRAB loop to holding heading through the Lat_HDG loop when passing the upper transition zone limit as depicted in FIG. 13. When slowing down, the lateral control laws will switch from Lat_HDG to Lat_CRAB when passing the lower transition zone limit.

The directional axis control law logic is also depicted in FIG. 15. When operating in the higher speed BCBT envelope, the directional control laws will hold lateral acceleration near zero (slip ball centered) through the Dir_TC loop whether the pilot has commanded a banked turn or is in level flight. In a banked turn in the GCBT envelope, the control laws will hold crab angle near zero through the Dir_TC loop. In non-turning flight with both the lateral and pedal controllers in detent when operating in the GCBT envelope, the control laws will hold heading through the Dir_HDG loop. During a non-turning acceleration, the control laws will switch from holding heading through the Dir_HDG loop to holding lateral acceleration through the Dir_TC loop when passing the upper transition zone limit as depicted in FIG. 13. When slowing down, the directional control laws will switch from Dir_TC to Dir_HDG when passing the lower transition zone limit.

Figure 16:
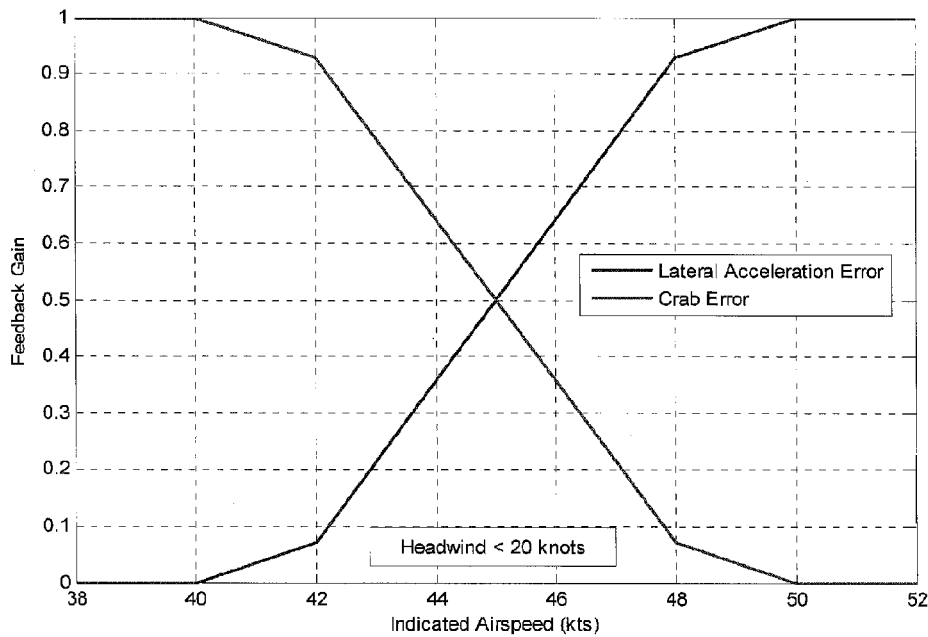
FIG. 16 shows a graph of lateral acceleration error verses crab error at an indicated airspeed.

When accelerating or decelerating through the transition zone in a banked turn, the control laws will use indicated airspeed in the Dir_TC loop to blend between GCBT and BCBT. Below the transition zone, the control laws will be in the GCBT envelope and will feedback the difference between commanded and actual crab angle (crab error). Above the transition zone, in the BCBT envelope, the control laws will feedback the difference between commanded and actual lateral acceleration (lateral acceleration error). While in the transition zone, the combined Dir_TC loop will blend between the crab and lateral acceleration error signals based on indicated airspeed as shown in FIG. 16. When exactly in the middle of the transition zone, half of the crab error signal and half of the lateral acceleration error signal will be fed back through the Dir_TC block.

In addition to using lateral acceleration feedback in the BCBT envelope, the control laws also compute the yaw rate required to maintain the BCBT based on bank angle and airspeed using the following equation:

$$r_{BCBT} = \sin \phi_{act} \cdot \cos \theta_{act} \cdot g / V_{tas} \qquad (2)$$

where $r_{BCBT}$ is the BCBT yaw rate in radians per second, $\phi_{act}$ is the actual bank angle, $\theta_{act}$ is the actual pitch angle, g is the gravitational constant (32.174 ft/sec²), and $V_{tas}$ is the true airspeed in feet per second. This equation is consistent with previous control law designs for high speed turn coordination.

In the GCBT envelope, in addition to using crab angle feedback to maintain a GCBT, the control laws use the following variation of Equation 2 to compute the required yaw rate:

$$r_{GCBT} = \sin \Delta\phi_{cmd} \cdot \cos \theta_{act} \cdot g / V_{xgs} \qquad (3)$$

where $r_{GCBT}$ is the GCBT yaw rate in radians per second, $\Delta\phi_{cmd}$ is the commanded bank angle change from trim, and $V_{xgs}$ is the forward groundspeed in feet per second. Using the commanded bank angle change from trim in this equation ensures that the initial yaw rate is in the direction of the turn, even though the aircraft may have an initial bank angle away from the turn to hold crab angle in a crosswind.

When accelerating or decelerating through the transition zone in a banked turn, the control laws will blend between Equations 2 and 3 by using the same speed blending algorithm depicted in FIG. 16.

Figure 17:
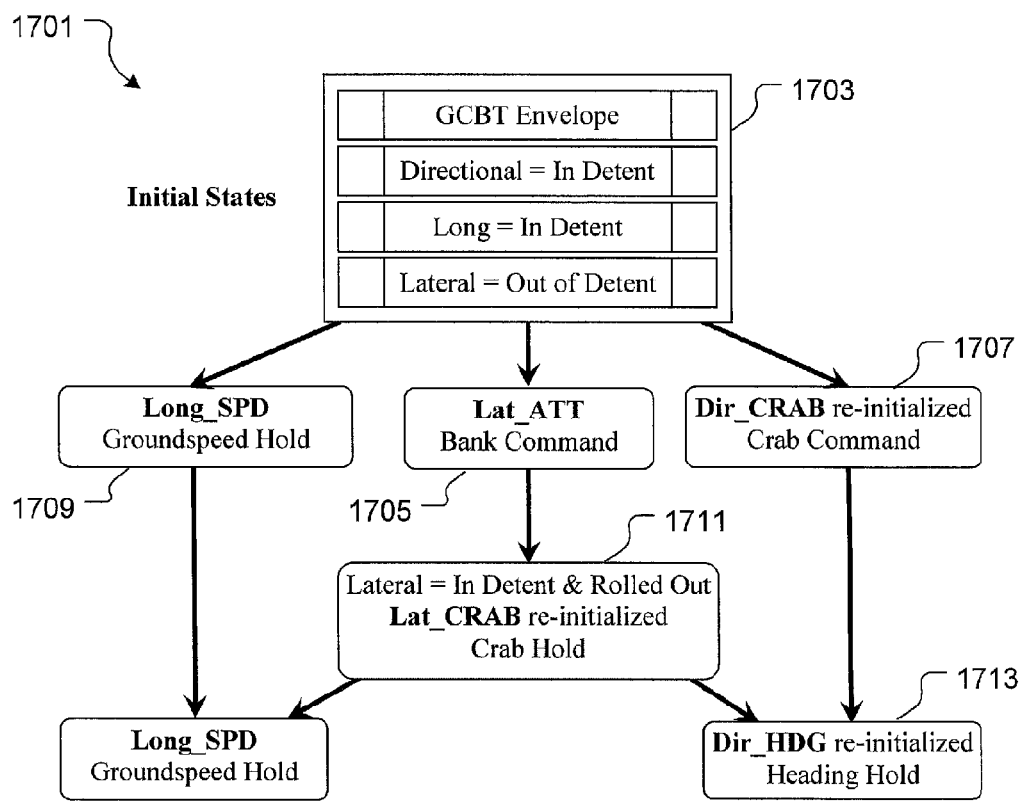
FIG. 17 shows a flow chart example of a ground control banked turn.

FIG. 17 shows a flow chart 1701 depicting an example of a GCBT. Box 1703 shows the initial states of the GCBT. In this exemplary embodiment, when the lateral controller is moved out of detent to command the banked turn, the lateral control laws will switch to bank command with the Lat_ATT loop, box 1705, the directional control laws will switch to crab command with the Dir_TC loop, box 1707, and the longitudinal control laws will remain in forward groundspeed hold with the Long_SPD loop, box 1709. Once the pilot moves the controller back into detent, the aircraft will roll out of the banked turn. When BT logic indicates that the aircraft is rolled out, the lateral control laws will switch to crab hold with the Lat_CRAB loop, box 1711, and the directional control laws will switch to heading hold with the Dir_HDG loop, box 1713.

Figure 18:
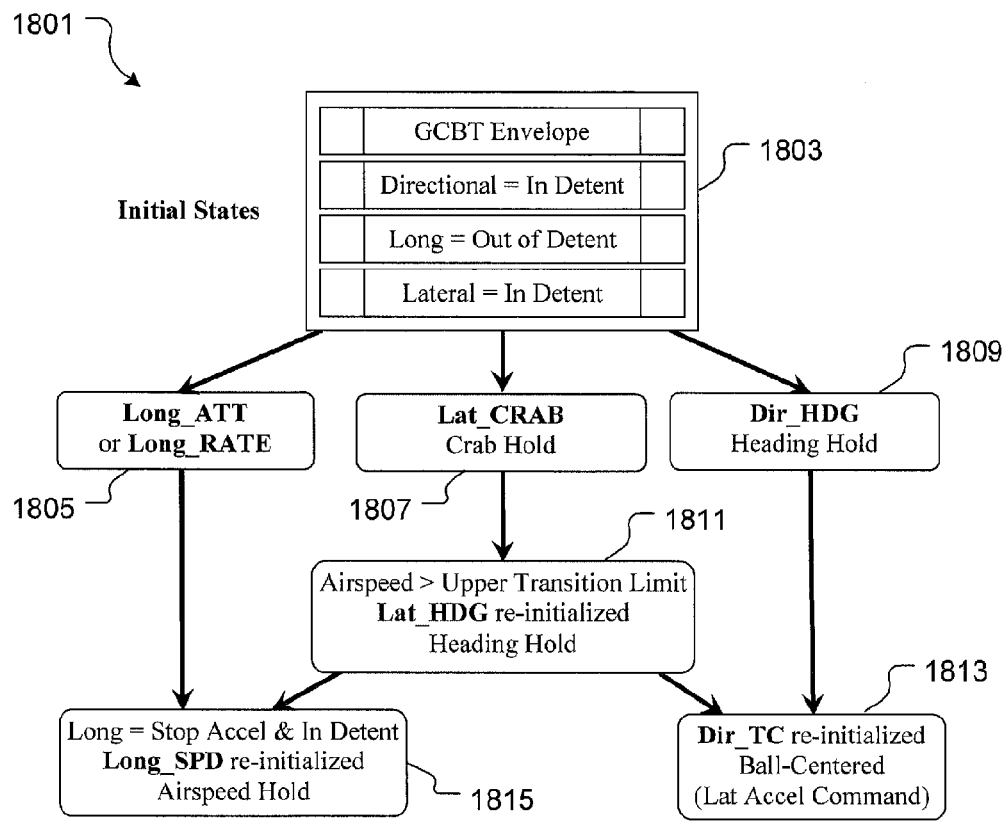
FIG. 18 shows a flow chart example of a non-turning acceleration through the transition zone.

FIG. 18 shows a flow chart 1801 depicting an example of a non-turning acceleration through the transition zone. Box 1803 shows the initial states of the GCBT. In this exemplary embodiment, when the longitudinal controller is moved out of detent to start the acceleration, the longitudinal control laws can engage either the Long_ATT or Long_RATE loops, box 1805. At this point, the lateral control laws will be in crab hold with the Lat_CRAB loop, box 1807, and the directional control laws will be in heading hold with the Dir_HDG loop, box 1809. Once the aircraft accelerates past the upper transition limit, the lateral control laws will switch to heading hold with the Lat_HDG loop, box 1811, and the directional control laws will switch to lateral acceleration command with the Dir_TC loop, box 1813. When the longitudinal controller is used to stop the acceleration and returned to detent, the longitudinal control laws will switch to airspeed hold with the Long_SPD loop, box 1815.

Figure 19:
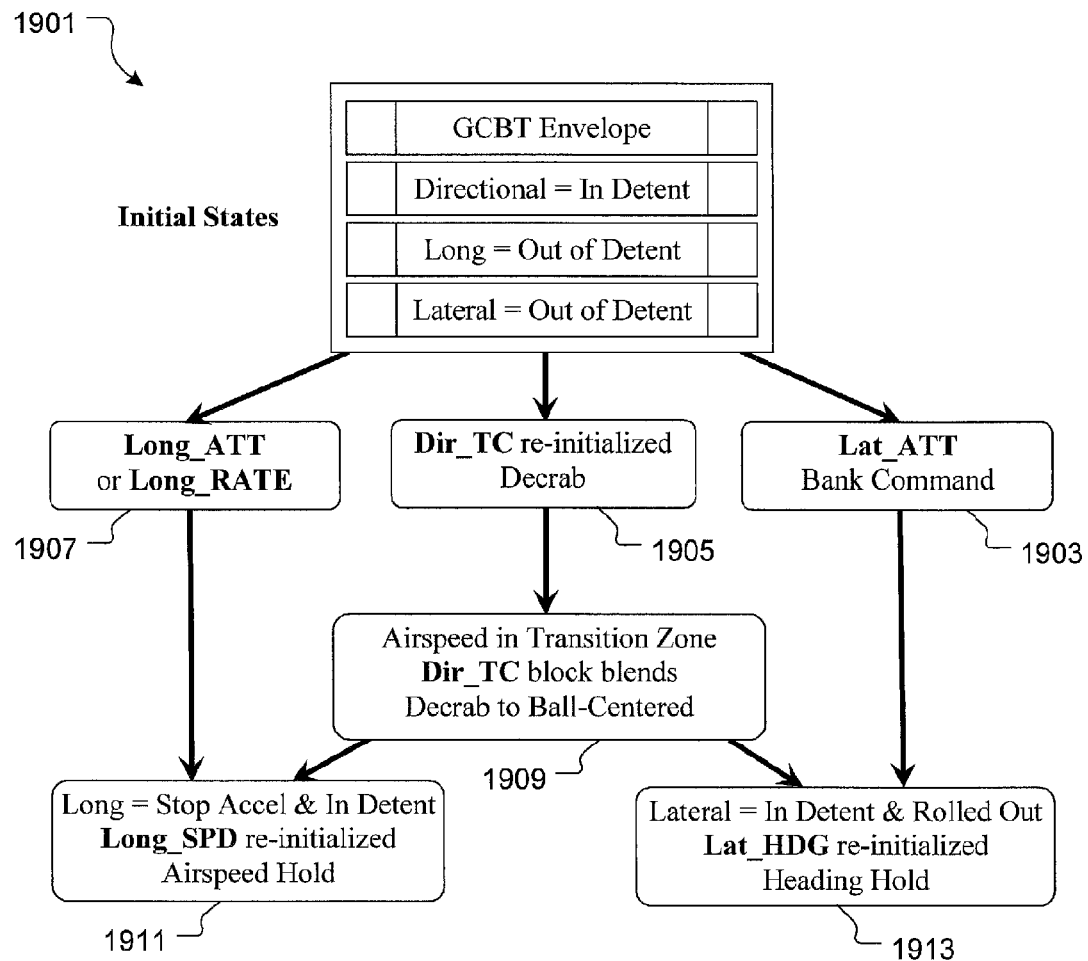
FIG. 19 shows a flow chart example of a banked turn acceleration through the transition zone.

FIG. 19 shows a flow chart 1901, which is an example of a banked turn acceleration through the transition zone. When the lateral controller is moved out of detent to command the banked turn, the lateral control laws will switch to bank command with the Lat_ATT loop 1903 and the directional control laws will switch to crab command with the Dir_TC loop 1905. When the longitudinal controller is moved out of detent to start the acceleration, the longitudinal control laws can engage either the Long_ATT or Long_RATE loops 1907. When speeding up through the transition zone, the directional control laws will blend from crab command to lateral acceleration command in the Dir_TC block 1909. When the longitudinal controller is used to stop the acceleration and returned to detent, the longitudinal control laws will switch to airspeed hold with the Long_SPD loop 1911. Once the pilot moves the lateral controller back into detent, the aircraft will roll out of the banked turn. When BT logic indicates that the aircraft is rolled out, the lateral control laws will switch to heading hold with the Lat_HDG loop 1913.

The control laws will enable the pilot to trim the aircraft in a banked turn throughout the flight envelope by using the roll beep switch. From a non-turning flight condition, when the pilot activates roll beep switch, the BT mode will turn on. While the beep switch is engaged, the control laws will command a steady roll rate through the Lat_RATE block in the appropriate direction. Once the roll beep is released, the Lat_ATT block will be re-engaged to hold the beeped bank angle.

The roll beep can also be used to relieve lateral control forces during a turn. In this case, the roll beep will adjust the bank trim reference through an integrator in the Lat_ATT block. As the bank trim reference is beeped toward the actual bank angle, the commanded bank angle from the lateral controller will need to be reduced to hold the same bank angle. Once the trim bank angle matches the actual bank angle, the lateral controller will be back in the detent position and the aircraft will be trimmed in a banked turn.

The pilot can use the either the roll beep or lateral controller to roll out from a trimmed bank turn. With the roll beep switch, the BT mode will turn off when the beep switch is released if BT logic determines that the aircraft is rolled out. At that point, the control laws will revert to either the Lat_HDG or Lat_CRAB loop, depending on forward speed. Likewise, if the lateral controller is used to roll out, once the pilot returns the lateral controller to in detent with bank angle, roll rate, and yaw rate below the BT thresholds, the control laws will turn off the BT mode and switch over to either Lat_HDG or Lat_CRAB.

Figure 20:
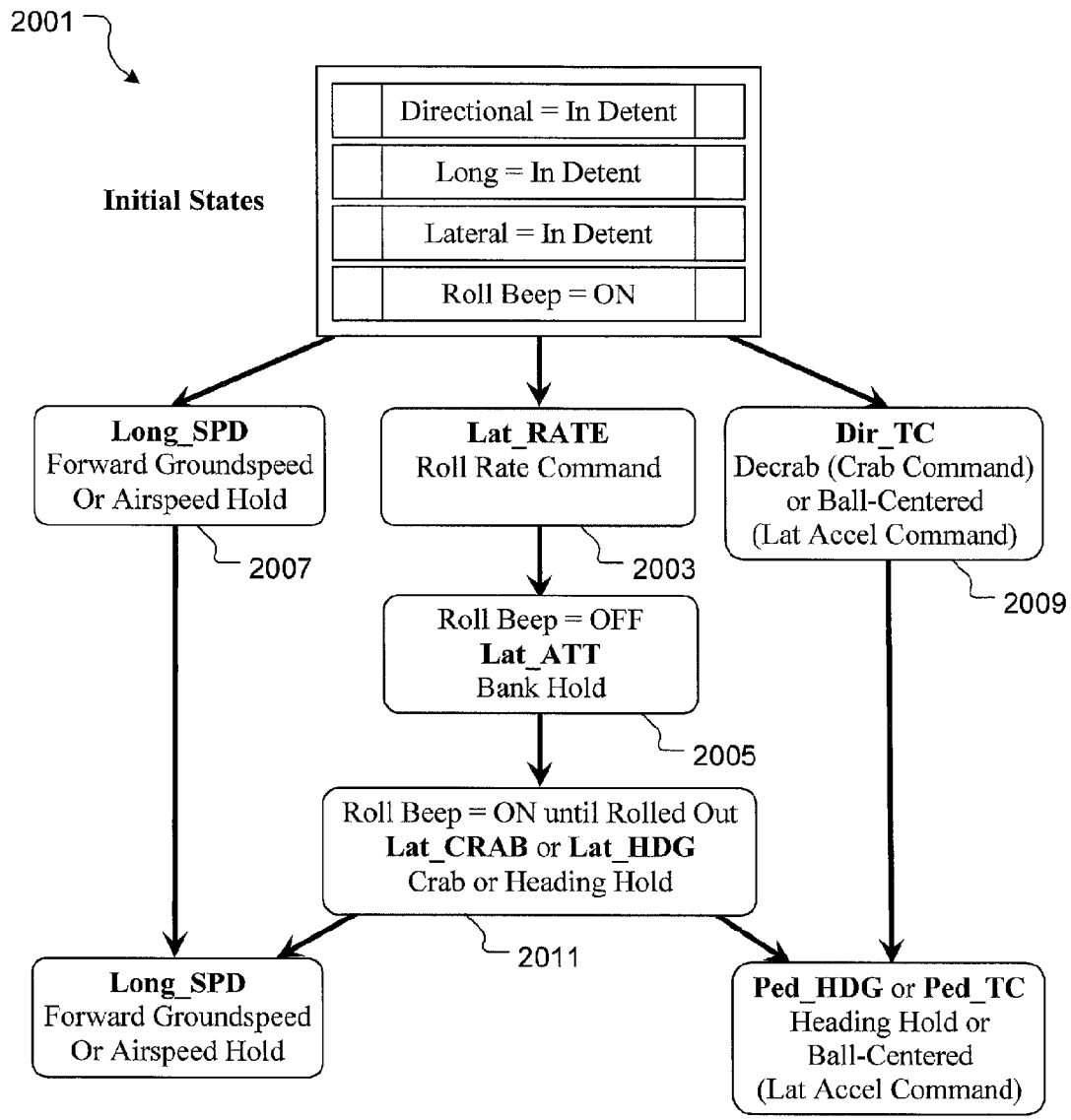
FIG. 20 shows a flow chart example of a banked turn using the roll beep switch.

FIG. 20 shows a flow chart 2001, which is an example of a banked turn using the roll beep switch. Once the roll beep is activated, the lateral control laws will roll in the appropriate direction with the Lat_RATE loop 2003. When the roll beep is released, the Lat_ATT loop 2005 will be engaged to hold bank. The longitudinal control laws will continue to hold either forward groundspeed in the GCBT envelope or airspeed in the BCBT envelope with the Long_SPD loop 2007. The directional control laws use the Dir_TC loop 2009 to coordinate the turn with either crab command in the GCBT envelope or lateral acceleration command in the BCBT envelope. When the roll beep is used to roll out of the turn, once the switch is released, the lateral control laws will switch back to either crab hold with the Lat_CRAB loop 2011 in the GCBT envelope or heading hold with the Lat_HDG loop 2011 in the BCBT envelope. In the GCBT envelope, the directional control laws will switch to heading hold with the Dir_HDG loop. In the BCBT envelope, the directional control laws will stay in lateral acceleration command with the Dir_TC loop.

Figure 21:
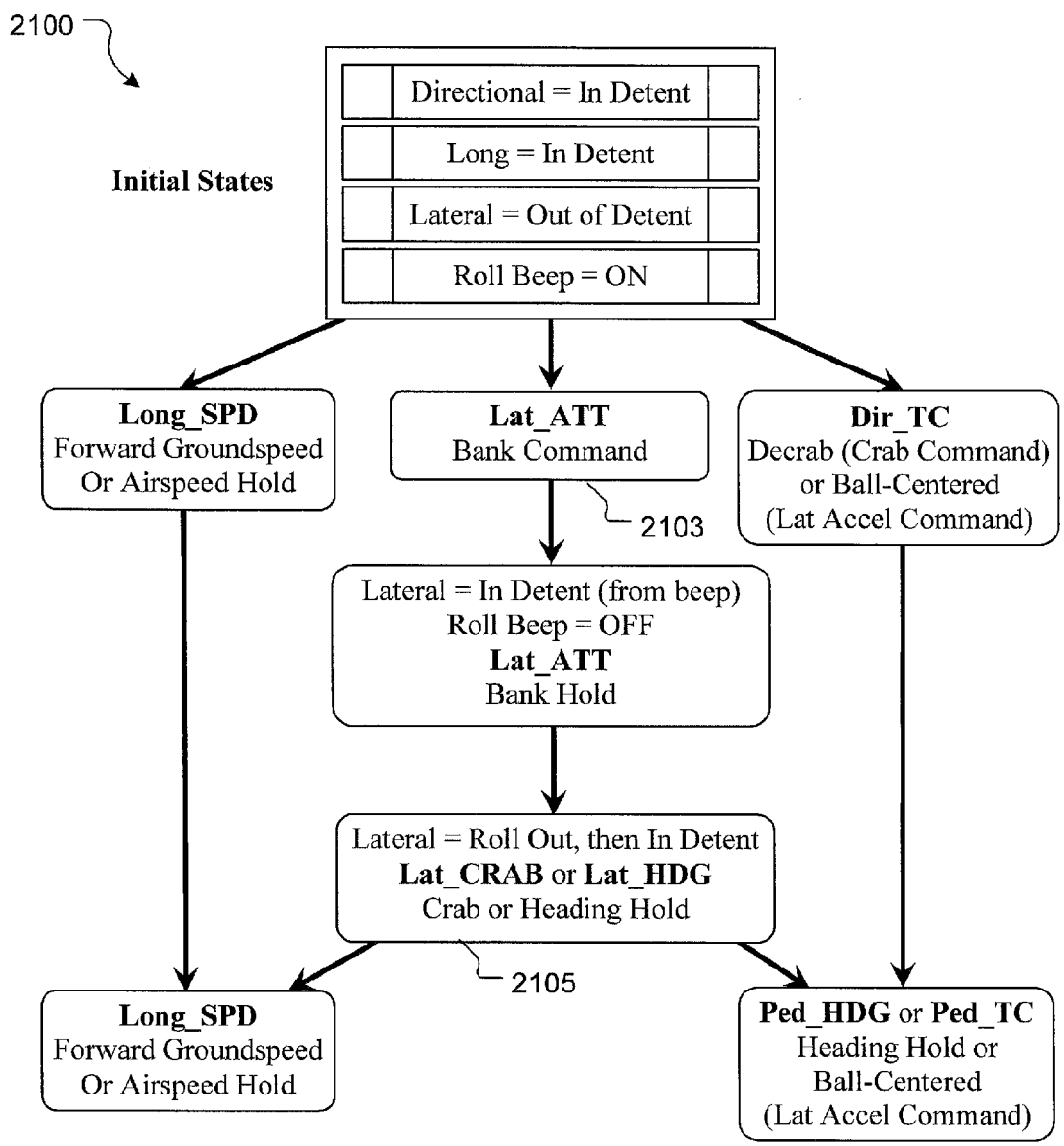
FIG. 21 shows a flow chart example of using the roll beep switch to relieve lateral controller forces, and then rolling out of a trimmed banked turn using the lateral controller.

FIG. 21 shows a flow chart 2100, which is an example of using the roll beep switch to relieve lateral controller forces, and then rolling out of a trimmed banked turn using the lateral controller. Once the banked turn is established with the lateral controller, roll beep into the turn will match the trim bank angle with the actual bank angle to relieve the control force and return the lateral controller to the detent position. At this point, the lateral control laws will be in bank hold through the Lat_ATT loop 2103. If the lateral controller is used to roll out of the trimmed banked turn, when the controller is returned to the detent position with bank angle, roll rate, and yaw rate below the BT thresholds, the lateral control laws will switch back to either crab hold with the Lat_CRAB loop 2105 in the GCBT envelope or heading hold with the Lat_HDG loop 2105 in the BCBT envelope.

Figure 22:
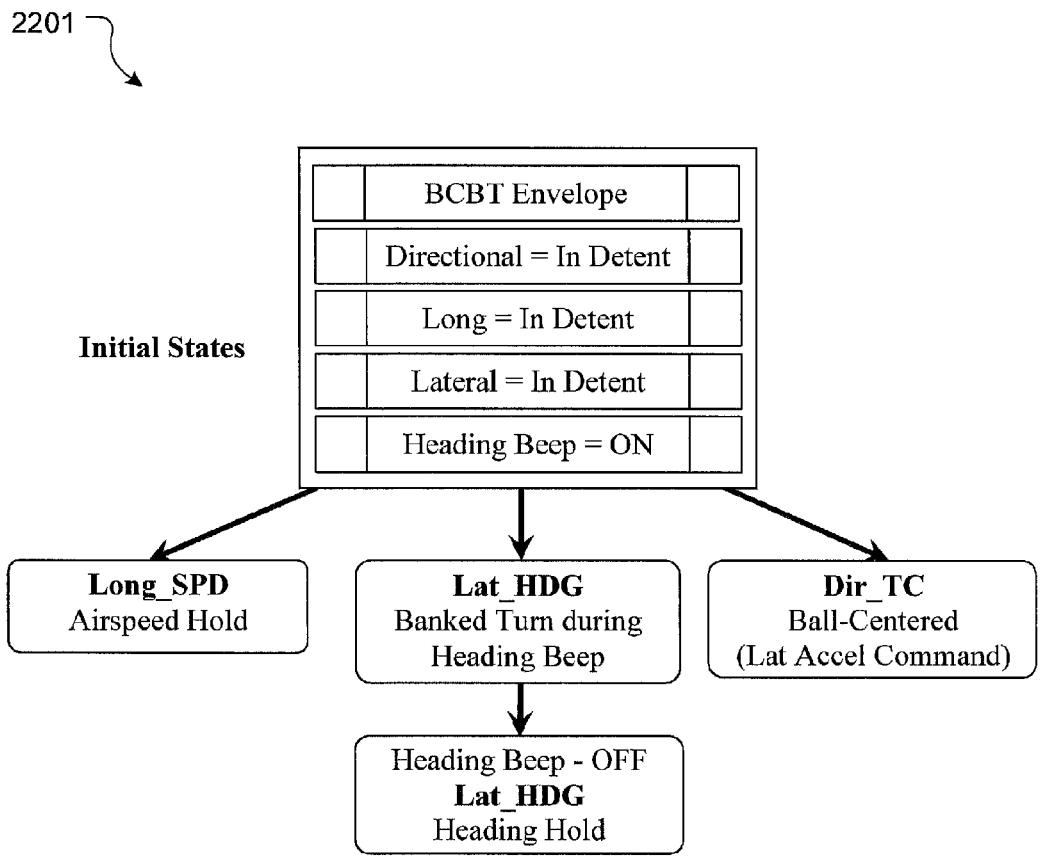
FIG. 22 shows a flow chart example of a heading beep command in the Ball-Centered Banked Turns envelope.

The control laws will also enable the pilot to adjust heading throughout the flight envelope by using the heading beep switch. In the BCBT envelope, the heading beep switch will slew the heading in the Lat_HDG block 2105, typically at the standard rate of 3 deg/sec. This will cause the aircraft to bank up to follow the beeped heading. Once the roll beep is released, the control laws will roll out and capture the new heading. FIG. 22 shows a flow chart 2201, which is an example of a heading beep command in the BCBT envelope.

Figure 23:
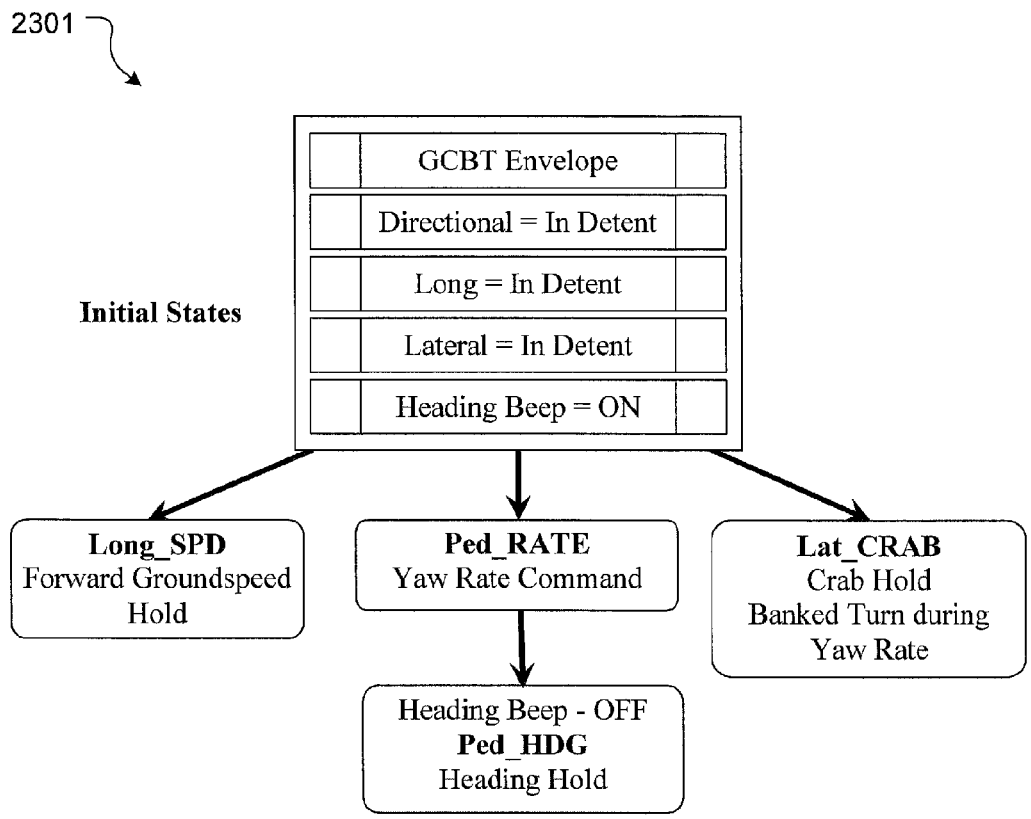
FIG. 23 shows a flow chart example of a heading beep in the GCBT envelope.

In the GCBT envelope, a heading beep will command a yaw rate (typically around 5 deg/sec) through the Dir_RATE block. In this case, the control laws will not turn on the BT mode. Instead, the control laws will keep the Lat_CRAB loop active, causing the aircraft to bank into the direction of the heading beep to hold crab angle. Once the heading beep is released, the Dir_HDG block will be re-engaged to hold heading, while the Lat_CRAB block will continue to adjust bank angle to hold crab angle. FIG. 23 shows a flow chart 2301, which is an example of a heading beep in the GCBT envelope.

This invention will enable the pilot to precisely fly GCBT at low speeds with minimal workload. The control laws use the pilot's commanded bank angle change to compute the yaw rate required for GCBT. Furthermore, the control laws feedback crab angle to keep the aircraft's heading aligned with ground track during GCBT.

This invention will also enable the pilot to smoothly transition between the low speed GCBT envelope and the higher speed BCBT envelope. When speeding up or slowing down through the transition zone in a banked turn, the control laws will blend between crab angle and lateral acceleration feedback to maintain a coordinated turn. When accelerating or decelerating through the transition zone in non-turning flight, the control law logic will switch control loops so that the aircraft will maintain heading while transitioning between ball-centered and constant crab angle flight.

This invention will also enable the pilot trim the aircraft in a banked turn by using the roll beep switch. Activation of the roll beep switch will command a roll rate and enable the Banked Turn mode. Control law logic will turn off the Banked Turn mode when bank is less than the banked turn threshold (typically 5°).

Lastly, this invention will enable the pilot to make precise heading adjustments by using the heading beep switch. In higher speed flight conditions, activation of the heading beep switch will slew the heading reference, resulting in a bank turn to the new heading. During low speed flight, the heading beep will command a yaw rate, resulting in a bank turn to hold aircraft crab angle.

This invention will lower pilot workload during banked turns when compared to previous control laws. The pilot will be able to consistently fly banked turns throughout the flight envelope by commanding bank with the lateral controller. The control laws will automatically ensure that the banked turns are ground-coordinated at low speeds and ball-centered at higher speeds. The control laws will automatically switch and blend control law blocks when speeding up or slowing down through the transition zone. The control laws will also allow the pilot to trim the aircraft in a banked turn with a roll beep switch and precisely control heading with a heading beep switch.

The particular embodiments disclosed above are illustrative only, as the invention may be modified and practiced in different but equivalent manners apparent to those skilled in the art having the benefit of the teachings herein. It is therefore evident that the particular embodiments disclosed above may be altered or modified, and all such variations are considered within the scope and spirit of the invention. Accordingly, the protection sought herein is as set forth in the description. It is apparent that an invention with significant advantages has been described and illustrated. Although the present invention is shown in a limited number of forms, it is not limited to just these forms, but is amenable to various changes and modifications without departing from the spirit thereof.

The invention claimed is:

1. An aircraft, comprising:
a sensor carried by the aircraft, the sensor being adapted to sense a directional movement of the aircraft;
an actuator carried by the aircraft, the actuator being utilized to control the directional movement of the aircraft; and
a control system in data communication with the aircraft sensor and operably associated with the actuator, the control system having:
a lateral control architecture the lateral control architecture, comprising:
a lateral crab angle control law;
a lateral heading control law; and
a lateral sideward groundspeed control law;
wherein the lateral crab angle control law, the lateral heading control law, and the lateral sideward groundspeed control law are operably associated with the sensors, the initialization logic, and a directional command;
a longitudinal control architecture; and
an initialization command logic in data communication with the lateral control architecture and in data communication with the longitudinal control architecture;
wherein the initialization command logic selectively activates the lateral control architecture for controlling the lateral motion of the aircraft and selectively activates the longitudinal control architecture for controlling the longitudinal motion of the aircraft; and
wherein the control system utilizes the lateral control architecture and the longitudinal control architecture to control speed variations of the aircraft while the aircraft maintains a full banked envelope turn with respect to a ground surface.

2. The aircraft of claim 1, further comprising:
a switch operably associated with the crab angle control law, the heading control law, and the sideward groundspeed control law.

3. The aircraft of claim 1, further comprising:
a lateral roll attitude control law operably associated with the crab angle control law, the heading control law, and the sideward groundspeed control law.

4. The aircraft of claim 3, further comprising:
a lateral roll rate operably associated with the lateral roll attitude control law;
wherein the lateral roll rate commands the actuator.

5. The aircraft of claim 4, wherein the lateral roll rate control law is an inner loop of the lateral control law architecture.

6. The aircraft of claim 1, the longitudinal architecture, comprising:
a longitudinal forward speed control law operably associated with both the sensor, the initialization logic, and the longitudinal commands.

7. The aircraft of claim 6, further comprising:
a longitudinal pitch angle control law operably associated with the sensors, the initialization logic, the longitudinal commands, and the longitudinal forward speed control law.

8. The aircraft of claim 6, further comprising:
a longitudinal pitch rate control law operably associated with the sensors, the initialization logic, the longitudinal commands, and the longitudinal pitch rate control law.

9. The aircraft of claim 8, wherein the longitudinal pitch rate control law is an inner loop of the lateral control law architecture.

10. The aircraft of claim 1, further comprising:
a directional control law architecture in data communication with the initialization command logic;
wherein the initialization command logic selectively activates the directional control law architecture for controlling the directional motion of the aircraft.

11. The aircraft of claim 10, the directional control law architecture, comprising:
a directional heading control law; and
a directional turn coordination control law;
wherein the heading control law and the turn coordination control law are operably associated with the sensors, the initialization logic, and a directional command.

12. The aircraft of claim 11, further comprising:
a directional yaw rate control law operably associated with the heading control law and the turn coordination control law.

13. The aircraft of 12, wherein heading control law and the turn coordination control law are both in data communication with the directional yaw rate control law.

14. The aircraft of claim 12, wherein the directional yaw rate control law is an inner loop.

15. The aircraft of claim 10, further comprising:
a switch operably associated with the directional heading control law and the directional turn coordination control law.

16. A control system, comprising:
a lateral control architecture, the lateral control architecture, comprising:
a lateral crab angle control law;
a lateral heading control law; and
a lateral sideward groundspeed control law;
a longitudinal control architecture;
a directional control law architecture; and
an initialization command logic in data communication with the lateral control architecture, the longitudinal control architecture, and the directional control law architecture;
wherein the initialization command logic selectively activates one or more of the lateral control architecture, longitudinal control law architecture, and the directional control law architecture for controlling an aircraft movement during flight; and
wherein the control system utilizes the lateral control architecture, the longitudinal control architecture, and the directional control law architecture to control speed variations of the aircraft while the aircraft maintains a full banked envelope turn with respect to a ground surface.

17. The system of claim 16, the longitudinal architecture, comprising:
a longitudinal forward speed control law;
a longitudinal pitch angle control law; and
a longitudinal pitch rate control law.

18. The aircraft of claim 16, the directional control law architecture, comprising:
  a directional heading control law; and
  a directional turn coordination control law.

* * * * *